United States Patent [19]
Mama et al.

[11] Patent Number: 5,376,994
[45] Date of Patent: Dec. 27, 1994

[54] COMPACT BI-COLOR ELECTROPHOTOGRAPHIC IMAGE FORMING APPARATUS

[75] Inventors: Takashi Mama, Yokohama; Yuji Yasuda; Kan Tomita, both of Tokyo; Fumihiro Miyagawa, Yokohama; Shinji Kobayashi; Takanobu Fujioka, both of Tokyo; Hidetoshi Kanai, Yokohama; Yoshiki Yoshida, Kawasaki, all of Japan

[73] Assignee: Ricoh Company, Ltd., Tokyo, Japan

[21] Appl. No.: 18,429

[22] Filed: Feb. 16, 1993

Related U.S. Application Data

[63] Continuation-in-part of Ser. No. 969,346, Oct. 30, 1992, Pat. No. 5,309,182.

[30] Foreign Application Priority Data

| Feb. 13, 1992 | [JP] | Japan | 4-059299 |
| Mar. 12, 1992 | [JP] | Japan | 4-053203 |
| Oct. 19, 1992 | [JP] | Japan | 4-279802 |
| Nov. 25, 1992 | [JP] | Japan | 4-315146 |
| Nov. 25, 1992 | [JP] | Japan | 4-315147 |
| Nov. 25, 1992 | [JP] | Japan | 4-315148 |

[51] Int. Cl.[5] .................... G03G 15/00; G03G 15/04
[52] U.S. Cl. .................... 355/215; 346/107 R; 346/139 R
[58] Field of Search .................... 355/202, 215, 219, 30; 346/107 R, 139 R, 153.1

[56] References Cited

U.S. PATENT DOCUMENTS

| 4,703,334 | 10/1987 | Mochimara et al. | 346/107 R X |
| 5,117,262 | 5/1992 | Yamaguchi | 355/215 |
| 5,185,629 | 2/1993 | Iino et al. | 355/215 |
| 5,235,348 | 8/1993 | Avonts | 346/107 R |

FOREIGN PATENT DOCUMENTS

| 62-131267 | 6/1987 | Japan | 355/215 |

Primary Examiner—Joan H. Pendegrass
Attorney, Agent, or Firm—Oblon, Spivak, McClelland, Maier & Neustadt

[57] ABSTRACT

An image forming apparatus having deflection scanning type and line type exposing devices and first and second developing devices arranged around a photoconductive element, so that parts around the photoconductive element are arranged with ease to promote the miniaturization of the apparatus. The exposing devices are selected based on the principle that the image quality is enhanced for an image of particular color and is lowered for an image of another color expected to be printed less frequently. Specifically, the deflection scanning type exposing device forms the image of the particular color, and the line type exposing device which has an inherently long optical path and simple structure forms the image of another color. Fans are provided to produce cooling air flow to the line type exposing device and to draw out toner dirt and ozone produced by the charger associated therewith. The line type exposing device and the associated charger are electrically insulated from each other and mounted in a common casing. Cleaning elements are provided to clean the charger and the line type exposing device during withdrawal of these elements from the photoconductive element.

7 Claims, 27 Drawing Sheets

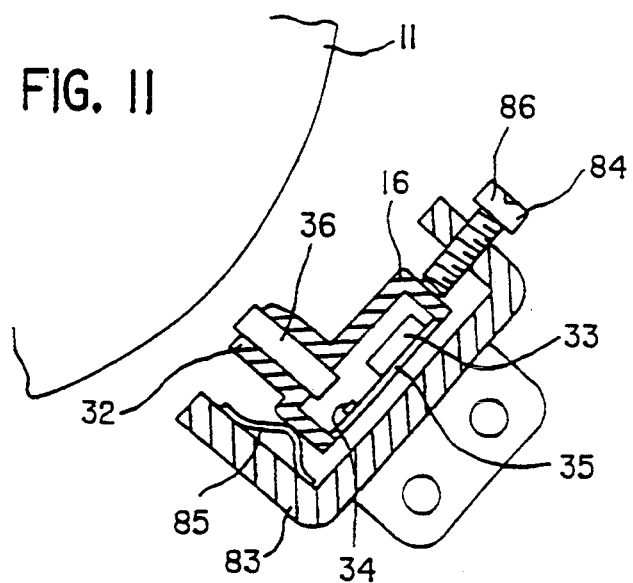
FIG. 11
FIG. 12A
FIG. 12B
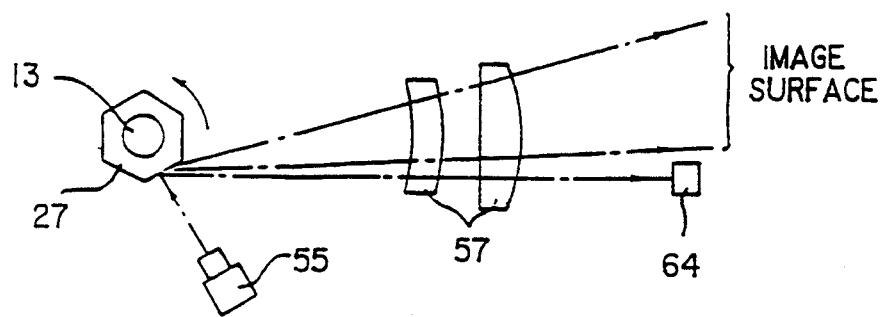
FIG. 13

COMPACT BI-COLOR ELECTROPHOTOGRAPHIC IMAGE FORMING APPARATUS

This is a continuation-in-part of U.S. Pat. application Ser. No. 07/969,346, filed Oct. 30, 1992, now U.S. Pat. No. 5,309,182.

BACKGROUND OF THE INVENTION

1. Field of the Invention

The present invention relates to an image forming apparatus for forming an image on a photoconductive element by an electrophotographic process.

2. Discussion of the Background

Conventional image forming apparatuses include one having exposing devices and developing devices provided in pairs and arranged around a photoconductive element, as disclosed in, for example, Japanese Patent Laid-Open Publication Nos. 19764/1982, 65570/1989, 223475/1989, 148063/1990, and 203315/1990. Each pair of exposing device and developing device is assigned to a particular color.

Each of the exposing devices at least includes a laser unit for emitting a laser beam, a cylindrical lens for condensing the laser beam in the subscanning direction, a polygonal mirror for deflecting the condensed laser beam, a motor for driving the polygonal mirror, an f-theta lens for correcting the laser beam from the polygonal mirror, and optical elements for conducting the corrected laser beam onto the photoconductive element. The problem with such an exposing device is that the optical path is extremely long and the structure is bulky. Moreover, the exposing devices each having the above construction cause a substantial space around the photoconductive element to be simply wasted, making the overall apparatus large sized.

SUMMARY OF THE INVENTION

It is therefore an object of the present invention to provide an image forming apparatus free from the drawbacks particular to the conventional apparatus as discussed above.

An image forming apparatus of the present invention comprises a rotatable photoconductive element, chargers located to face the periphery of said photoconductive element, deflection scanning type exposing devices for deflecting a light beam issuing from a beam emitting element toward the photoconductive element, a first developing device for developing an electrostatic latent image formed on the periphery of the photoconductive element by the deflection scanning type exposing device, a line type exposing device located to face part of the periphery of the photoconductive element other than part where the light beam from the deflection scanning type exposing device is incident, and a second developing device for developing an electrostatic latent image formed on the periphery of the photoconductive element by the line type exposing device. Fans are provided to produce cooling air flow to the line type exposing device and to draw out toner dirt and ozone produced by the charger associated therewith. The line type exposing device and the associated charger are electrically insulated from each other and mounted in a common casing. Cleaning elements are provided to clean the charger and the line type exposing device during withdrawal of these elements from the photoconductive element.

BRIEF DESCRIPTION OF THE DRAWINGS

The above and other objects, features and advantages of the present invention will become more apparent from the following detailed description taken with the accompanying drawings in which:

FIG. 11 is a sectional front view showing another alternative embodiment of the present invention;

FIGS. 12A and 12B each shows a particular condition of scanning lines;

FIG. 13 is a plan view of deflection scanning type exposing means representative of another alternative embodiment of the present invention;

DESCRIPTION OF THE PREFERRED EMBODIMENTS

To better understand the present invention, a brief reference will be made to some conventional image forming apparatuses of the type having a plurality of pairs of exposing means and developing means arranged around a photoconductive element.

Figure 22:
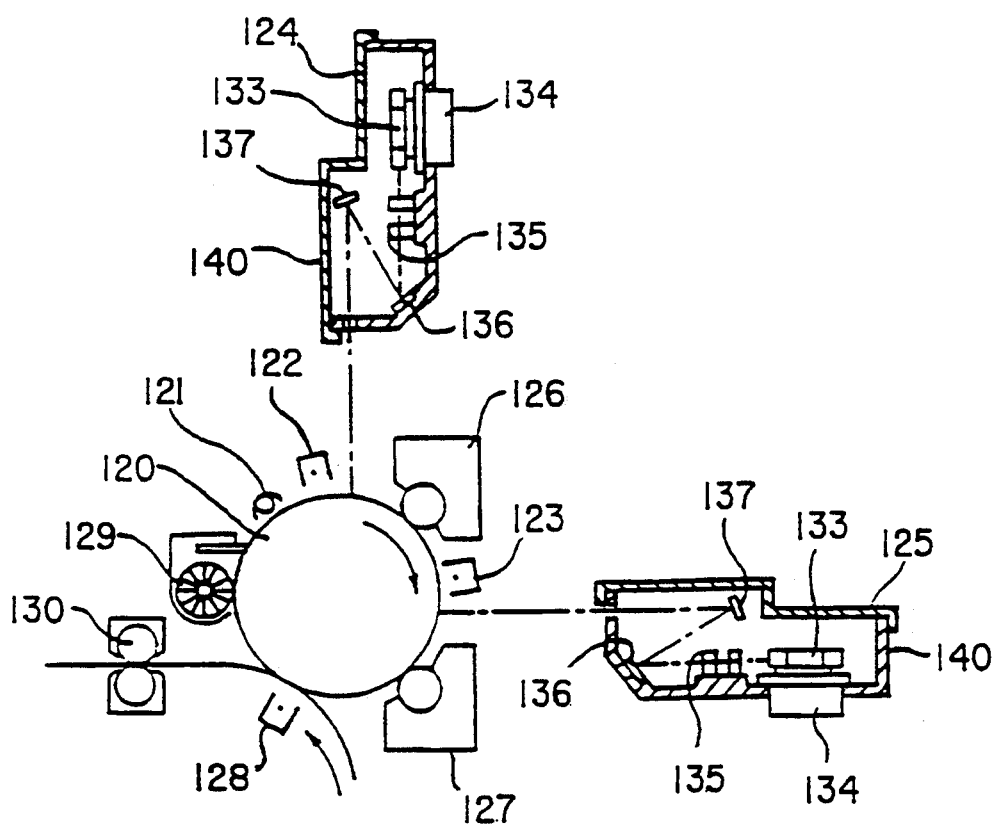
FIG. 22 is a sectional side elevation of a conventional image forming apparatus.
Figure 23:
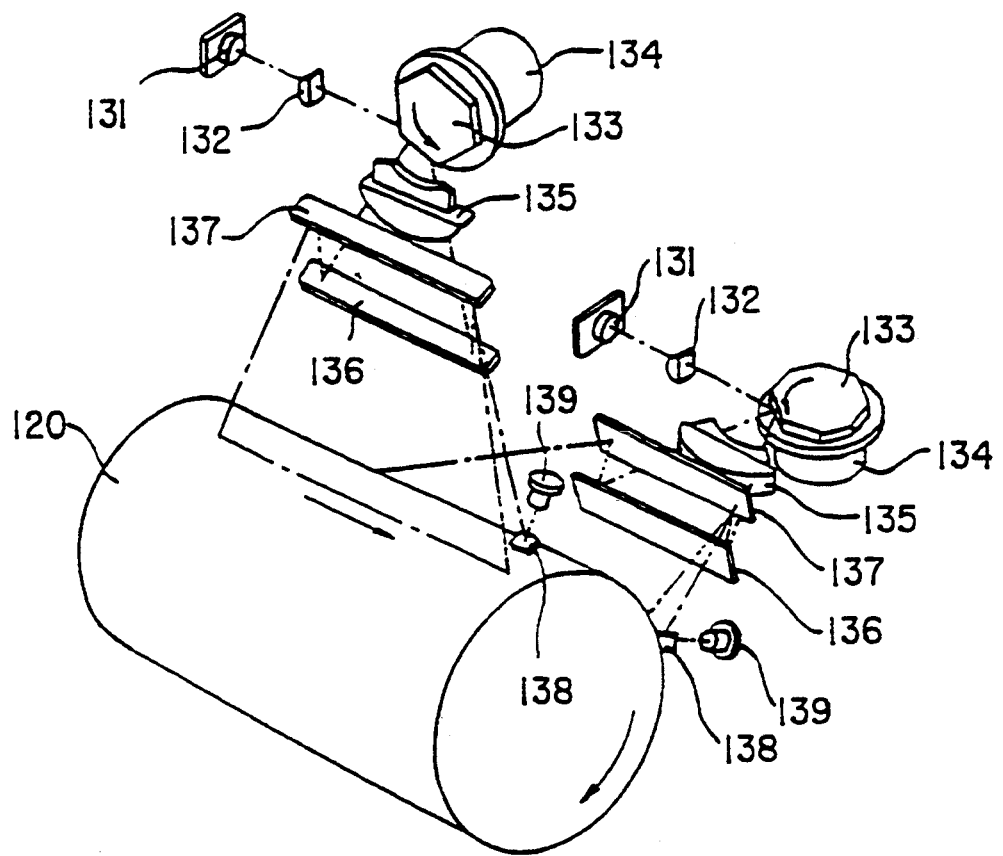
FIG. 23 is a perspective of the apparatus shown in FIG. 22.

Referring to FIGS. 22 and 23, a conventional image forming apparatus has a photoconductive element implemented as a drum 120. Arranged around the drum 120 are a discharge lamp 121, a plurality of main chargers 122 and 123, a plurality of exposing means 124 and 125, a plurality of developing means 126 and 127, a transfer charger 128, and a cleaning unit 129. While the drum 120 is rotated, the main charger 122 assigned to a particular color (e.g. black) uniformly charges the surface of the drum 120. The exposing means 124 also assigned to the particular color scans the charged surface of the drum 120 by an optical signal corresponding to an image signal, whereby a latent image is electrostatically formed on the drum 120. The developing means 126 assigned to the same color develops the latent image by use of a toner. Subsequently, the main charger 123 assigned to another color (e.g. red) uniformly charges the surface of the drum 120, the exposing means 125 scans the charged surface of the drum 120 to form an electrostatic latent image, and the developing means 127 develops the latent image. The resulting bicolor toner image is transferred from the drum 120 to a recording medium, e.g., paper sheet. A fixing roller 130 fixes the toner image on the paper sheet by heat and pressure. The cleaning unit 129 removes the toner remaining on the drum 120 after the image transfer, and then the discharge lamp 121 dissipates the charge remaining on the drum 120.

The exposing means 124 and 125 each includes a laser unit 131 for emitting a laser beam. A cylindrical lens 132 condenses the laser beam toward a polygonal mirror 133 and only in the subscanning direction. A polygonal mirror 133 is rotated by a motor 134 to deflect the incident laser beam. An f-theta lens 135 corrects the laser beam from the polygonal mirror 133 such that the beam is deflected at a constant speed along the axis of the drum 120. The corrected laser beam is incident to the drum 120 via mirrors 136 and 137. The optics constituting the exposing means 124 and 125 are accommodated in respective housings 140.

Figure 24:
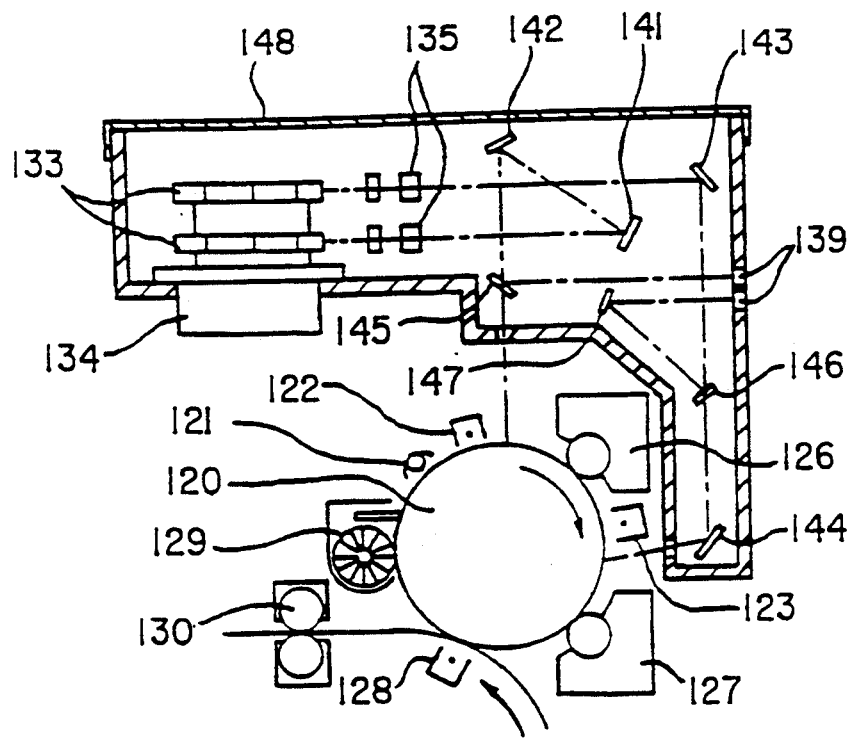
FIG. 24 is a sectional front view showing another conventional image forming apparatus.

Another conventional image forming apparatus is shown in FIG. 24. In FIG. 24, the same or similar constituents to those shown in FIGS. 22 and 23 are designated by the same reference numerals, and a detailed description will not be made to avoid redundancy. Laser beams issuing from respective laser units, not shown, are condensed by respective cylindrical lenses, not shown, in the subscanning direction. The condensed laser beams are deflected by the respective polygonal mirrors 133. The beam from one of the polygonal mirrors 133 is reflected toward the drum 120 by mirrors 141 and 142 while the beam from the other polygonal mirror 133 is reflected toward the drum 120 by mirrors 143 and 144. As a result, two electrostatic latent images are formed on the drum 120 at circumferentially spaced positions. The developing means 126 and 127 each develops one of the two latent images in a particular color. At the same time, the beam from the mirror 142 is incident to a position sensor 139 via a mirror 145 while the beam from the mirror 143 is incident to another position sensor 139 via mirrors 146 and 147. Such optical arrangements are accommodated in a single housing 148.

The problem with the apparatus having a plurality of exposing means 124 and 125, FIGS. 22 and 23, is that the structure is bulky due to the laser units 131, motors 134, polygonal mirrors 133 and other optical elements and due to the long optical paths. This problem is particular to the deflection scanning type exposing means. Moreover, since a plurality of exposing means 124 and 125 are located independently of each other, substantial part of the space around the drum 120 is wasted, making the overall structure more bulky. In addition, when a plurality of exposing means 124 and 125 are used, it is likely that the latent images formed thereby are dislocated, i.e., colors are brought out of register on a color printing.

The apparatus shown in FIG. 24 has a single motor 134 for driving the two polygonal mirrors 132 and has a single housing 148 accommodating all the optical arrangements. Such a configuration is slightly smaller in size than the configuration of FIGS. 22 and 23. However, the size reduction achievable with the apparatus of FIG. 24 is limited due to the deflection scanning type exposing means. As a result, the space available around the drum 120 cannot be increased, preventing the developing means 126 and 127 from incorporating a larger toner container. Therefore, the developing means 126 and 127 each has to be supplemented with a toner frequently.

Figure 1:
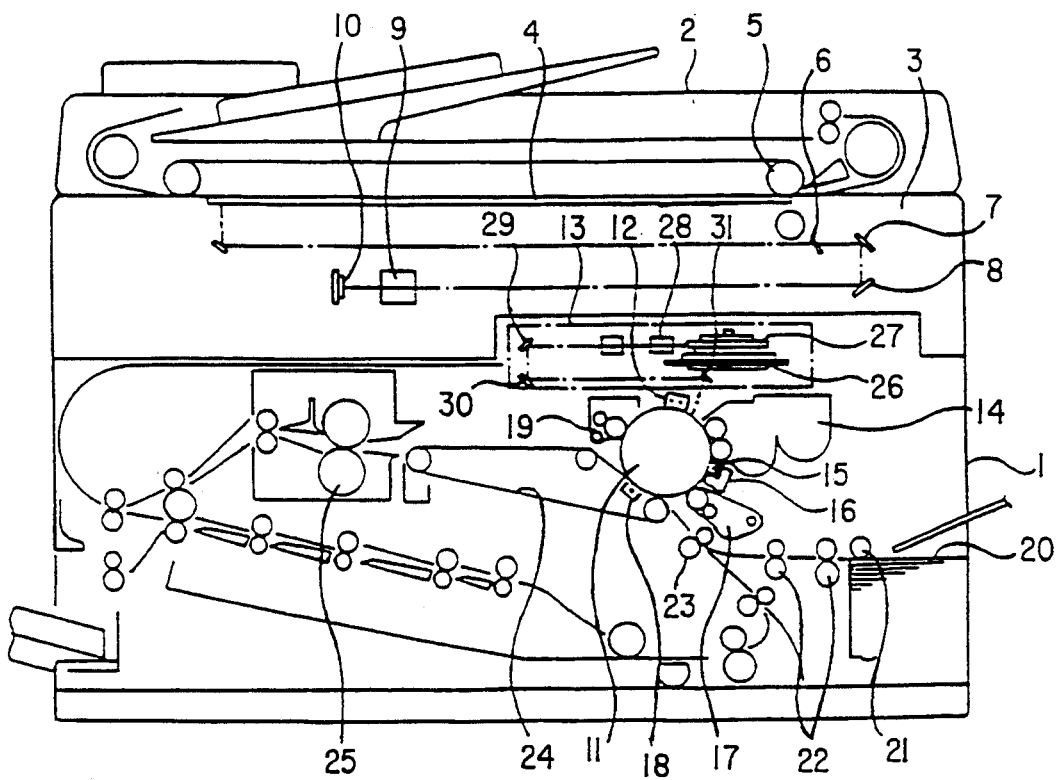
FIG. 1 is a sectional front view of an image forming apparatus embodying the present invention.
Figure 2:
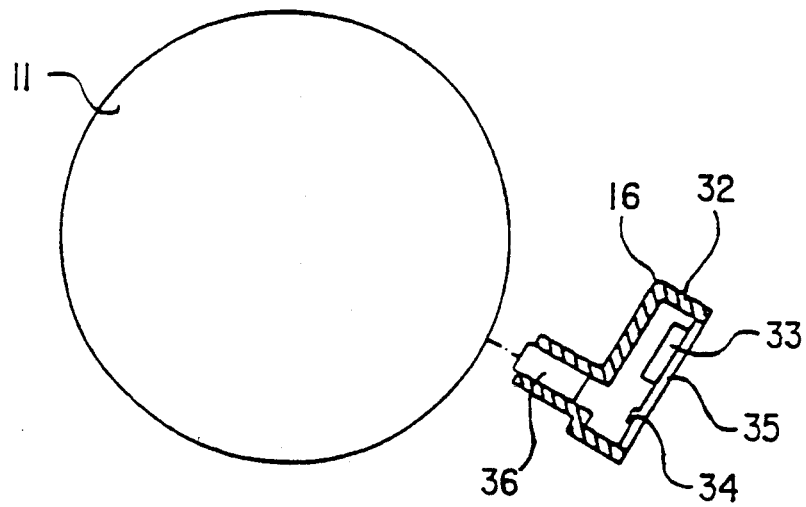
FIG. 2 is a sectional front view of line type exposing means included in the embodiment.

Referring to FIGS. 1 and 2, an image forming apparatus embodying the present invention is shown and implemented as a digital copier by way of example. As shown, the copier has a body 1 and an automatic document feeder (ADF) mounted on the top of the body 1. An image reading device 3 is accommodated in and located in an upper portion of the body 1 for reading a document fed by the ADF 2. Specifically, as a document is positioned on a glass platen 4 by the ADF 2, the image reading device 3 illuminates it with a light source 5. The resulting reflection from the document is sequentially reflected by a plurality of mirrors 6, 7 and 8 and then focused by a lens 9 onto a CCD (Charge Coupled Device) image sensor 10. The CCD image sensor 10 transforms color components of the document image separated by a filter, not shown, to electric signals of corresponding colors.

A photoconductive element in the form of a drum 11 is rotatably disposed below the image reading device 3. Arranged around the drum 11 are a first main charger 12, deflection scanning type exposing means 13, first developing means 14, a second main charger 15, line type exposing means 16, second developing means 17, an image transfer unit 18, and a cleaning unit 19o A paper tray, not shown, is mounted on one side of the body 1. A pick-up roller 21 for feeding paper sheets one by one from the paper tray, a plurality of transport rollers 22, a register roller 23, an image transfer belt 24, and a fixing section 25 are also mounted on the body 1.

The deflection scanning type exposing means 13 includes a laser diode or similar beam emitting device, not shown, and a cylindrical lens, not shown, for condensing a beam from the beam emitting device in the sub-scanning direction. A polygonal mirror 27 is rotated by a motor 26 to deflect the condensed beam. The deflected beam is incident to the drum 11 via mirrors 29, 30 and 31.

As shown in FIG. 2, the line type exposing means 16 has a housing 32 accommodating a base plate 35 and a rod lens array 36. The base plate 35 supports an IC (Integrated Circuit) drive circuit 33 and an LED (Light Emitting Diode) array chip 34 thereon. The rod lens array 36 is located to face the LED array chip 34. The LED array chip 34 has a number of LEDs arranged in the axial direction of the drum 11 and connected to the IC drive circuit 33 by wire bonding.

In operation, the image data or video data generated by the image reading device 3, i.e., by the CCD image sensor 10 in the form of electric signals of respective colors are processed by an image processing section, not shown. Subsequently, the video data of particular color (e.g. black) is fed to the deflection scanning type exposing means 13. The video data of another color (e.g. red) is once stored in a memory, not shown, and then fed to the line type exposing means 16 later than the above-mentioned image data of particular color. While the drum 11 is rotated clockwise, the first and second charges 12 and 15 each discharging at a predetermined time charge the surface of the drum 11. As a result, the two exposing means 13 and 16 form respective latent images on the charged surface of the drum 11. The first and second developing means 14 and 17 each develops one of the latent images. A paper sheet 20 is fed by the pick-up roller 21 and transport rollers 22 and then driven by the register roller 23 in synchronism with the rotation of the drum 11. As the paper sheet 20 reaches lower part of the drum 11, the image transfer unit 18 transfers the developed images from the drum 11 to the paper sheet 20. The fixing section 25 fixes the bicolor image on the paper sheet 20 by heat and pressure.

In such a bicolor digital copier, a black-and-white image is considered to be the primary image and formed in high resolution by the deflection scanning type exposing means 13 which has an inherently high pixel density. Since an image of the other color, e.g., red is printed less frequently than a black-and-white image, it is formed by the line type exposing means 16 having a short optical path and simple structure although the image quality may be lowered. This facilitates the arrangement of parts around the drum 11 and allows each of the developing means 14 and 17 to be loaded with a larger toner container. In addition, the entire copier body 1 is miniaturized.

The memory for storing image data needs only a minimum of capacity since the line type exposing means 16 has a smaller number of tones per dot and a lower pixel density than the deflection scanning type exposing means 13. This contributes to the cut-down of cost.

While the line type exposing means 16 has been shown and described as having the LED array chip 34 as a major component thereof, the LED array chip 34 may be replaced with a fluorescent tube dot array or a combination of a fluorescent lamp or similar light source and a liquid crystal shutter array or PLZT shutter array.

Figure 3:
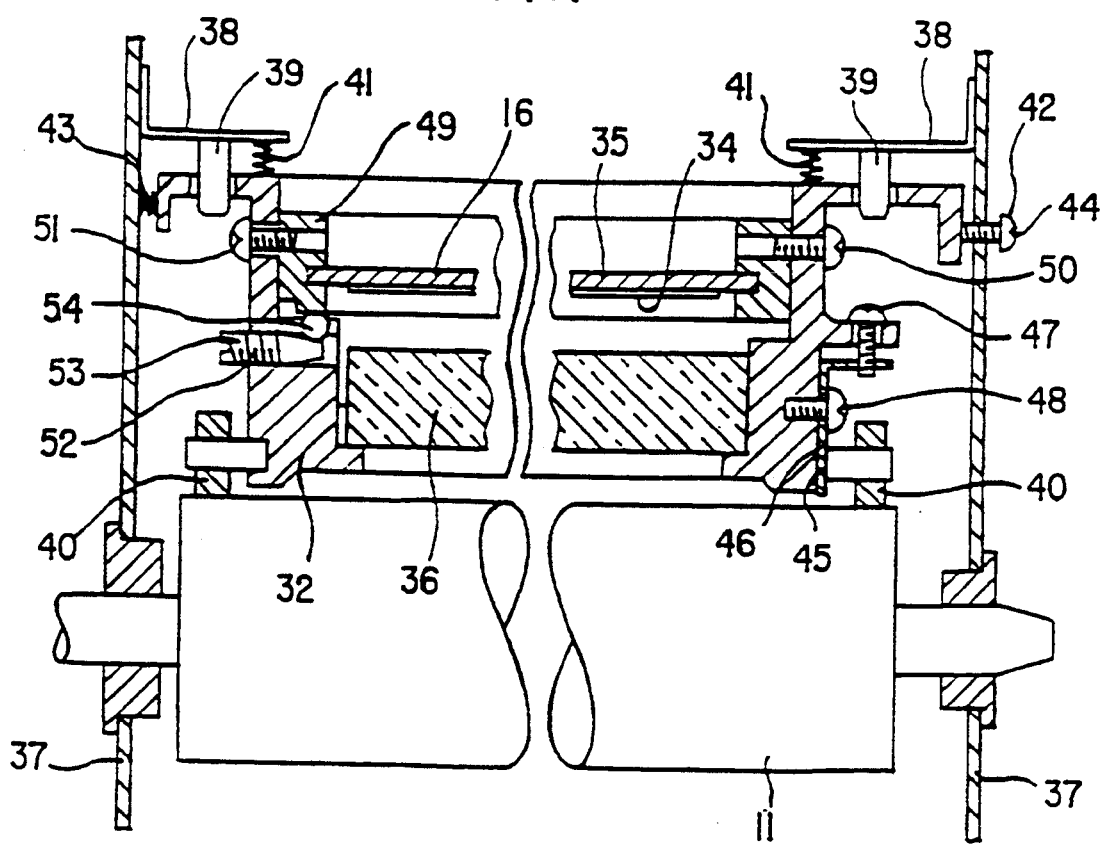
FIG. 3 is a sectional side elevation showing an alternative embodiment of the present invention.
Figure 4A:
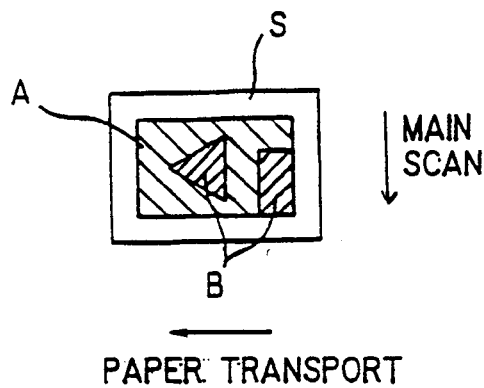
FIGS. 4A and 4B each shows a particular image forming condition.
Figure 4B:
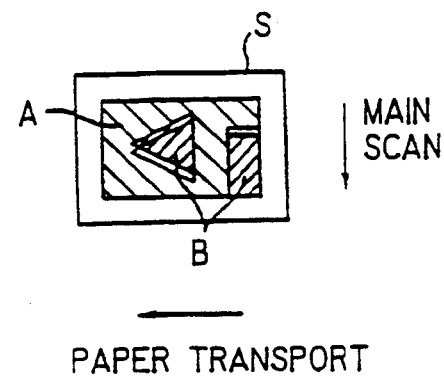

FIGS. 3, 4A and 4B show an alternative embodiment of the present invention. In the figures, the same or similar constituents to those of the previous embodiment are designated by the same reference numerals, and a detailed description will not be made to avoid redundancy. This is also true with other embodiments to follow. As shown, the drum 11 is rotatably supported by a left and a right side panel 37.

A generally L-shaped support 38 is affixed to each of the side panels 37 while a pin 39 is studded on each support 38. The housing 32 of the line type exposing means 16 is slidably supported by the pins 39 at opposite sides thereof. Rollers 40 are mounted on opposite sides of the housing 32 and biased against opposite edges of the periphery of the drum 11 by springs 41, whereby the distance between the housing 32 and the drum 11 is determined. Image position changing means 42 is provided for changing the image position of the line type exposing means 16 in the main scanning direction, as needed. The image position changing means 42 is constituted by a spring 43 biasing the housing 32 to one side, and an adjusting screw 44 threaded into one of the side panels 37 and urging the housing 32 against the action of the spring 44.

In the above construction, when the adjusting screw 44 is driven, the line type exposing means 16 is bodily moved in the axial direction of the drum 11 to change the image forming position on the drum 11 in the main scanning direction. FIG. 4A shows a condition wherein images A and B formed by the deflection scanning type exposing means 13 and line type exposing means 16, respectively, are in register. FIG. 4B shows a condition wherein the image B is deviated from the image A. When the condition shown in FIG. 4B occurs, the adjusting screw 44 is turned to shift the exposing means 16 along the axis of the drum 11 until the image B has been brought into register with the image A.

Referring again to FIG. 3, another alternative embodiment of the present invention will be described. This embodiment includes an angle adjusting mechanism 45 for moving or inclining the line type exposing means 16 relative to the axis of the drum 11. The angle adjusting mechanism 45 is made up of a generally L-shaped bracket 46 slidably mounted on one side of the housing 32, an adjusting screw 47 having a head rotatably retained by the housing 32 and having a shank driven into the bracket 46, and a fixing screw 48 pressing the bracket 46 against the one side of the housing 32. One of the previously stated rollers 40 is supported by the bracket 46. Before the fixing screw 48 is tightened, the adjusting screw 47 may be turned to change the position of the roller 40 supported by the bracket 46 relative to the housing 32. Then, the angular position of the line type exposing means 16 relative to the axis of the drum 11 will change. As a result, the angle of the beam incident on the drum 11 from the LED array chip 34 and, therefore, the image forming width on the drum 11 in the main scanning direction will be adjusted. Specifically, the angle adjusting mechanism 45 plays the role of image position changing means for changing the image forming width in the main scanning direction.

Another alternative embodiment of the present invention will be described with reference to FIG. 3. In the line type exposing means 16, the base plate 35 supporting the LED array chip 34 is mounted on a support member 49. The support member 49 is affixed to the right end of the housing 32 by a fixing screw 50 at the right end thereof. The left end of the support member 49 is held by the left end of the housing 32 in such a manner as to be movable away from the drum 11 and is fixed in place by a fixing screw 51. An angle adjusting mechanism 52 is provided for angularly displacing the base plate 35 relative to the axis of the drum 11. The mechanism 52 has a tapered adjusting screw 53 threaded into the left end of the housing 32, and a steel ball 54 intervening between the adjusting screw 53 and the left end of the support member 49.

In the above construction, when the adjusting screw 53 is turned in the tightening direction with the fixing screw 51 loosened, the steel ball 54 presses the left end of the support member 49 away from the drum 11. When the adjusting screw 53 is turned in the loosening direction, the support member 49 is moved toward the drum 11. As a result, the inclination of the base plate 35 and LED array chip 34 is changed relative to the axis of the drum 11. This in turn changes the angle of the beam incident on the drum 11 from the LED array chip 34 and, therefore, the image forming width on the drum 11 in the main scanning direction. In this sense, the angle adjusting mechanism 53 plays the role of image position changing means for changing the image forming width in the main scanning direction.

Figure 5:
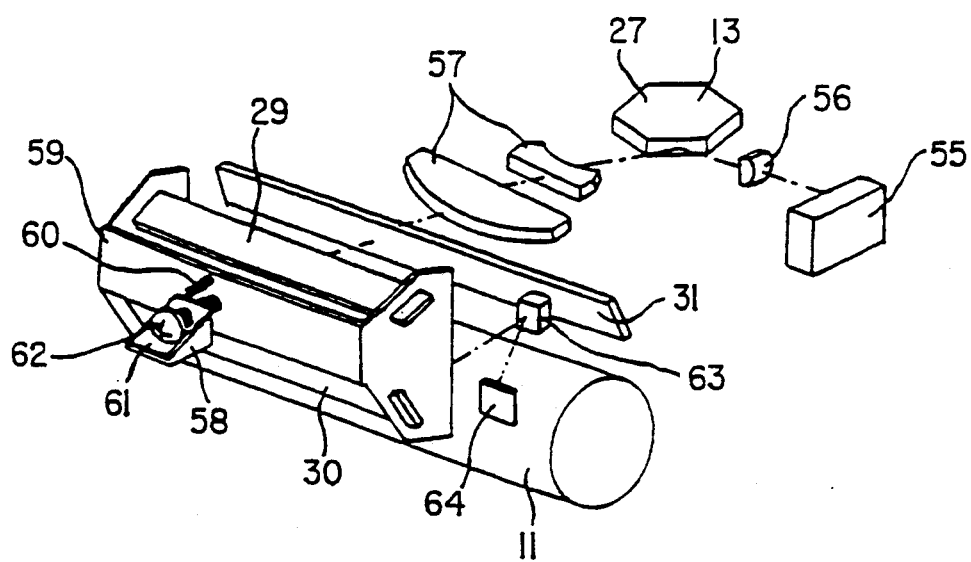
FIG. 5 is a perspective view of deflection scanning type exposing means representative of another alternative embodiment of the present invention.

A reference will be made to FIG. 5 for describing another alternative embodiment of the present invention. As shown, the deflection scanning type exposing means 13 is constructed such that a laser beam issuing from a laser diode 55 is routed through a lens 56 to the polygonal mirror, or deflector, 27 and steered by the mirror 27 to the drum 11 via the mirrors 29, 30 and 31. An f-theta lens 57 is interposed between the polygonal mirror 27 and the mirror 29. A mirror 63 and a PIN photodiode or similar sensor 64 are located outside the scanning range. As the mirror 30 reflects light reflected by an end portion of the mirror 30, the sensor 64 generates a synchronization signal on receiving the light from the mirror 63. A path length adjusting mechanism 58 is provided for changing the length of the optical path extending from the polygonal mirror 27 to the drum 11. The mechanism 58 is constituted by a spring 60 biasing a support 59 supporting the mirrors 29 and 30 away from the polygonal mirror 27, and an adjusting screw 62 threaded into a bracket 61 and urging the support 59 against the action of the spring 60. The bracket 61 is affixed to a frame or similar stationary member, not shown.

In this embodiment, as the adjusting screw 62 is turned, the support 59 is moved toward or away from the polygonal mirror 27 together with the mirrors 29 and 30. As a result, the length of the optical length extending from the polygonal mirror 27 to the drum 11 changes. This in turn changes the diameter of the beam spot as measured on the drum 11, i.e., the image forming width in the main scanning direction. In this manner, the image forming width of the deflection scanning type exposing means 13 in the main scanning direction can be adjusted by taking account of the deviation of an image to be formed by the line type exposing means in the main scanning direction. Then, images formed by the two exposing means 13 and 16 will be free from deviation, insuring an attractive printing with accurately registered colors. The path length adjusting means 58 also plays the role of image position changing means.

Other alternative embodiments will be described hereinafter in which the image position changing means is implemented by electric circuitry. As stated above, the image position changing means includes a method of moving the image forming position in the main scanning direction and a method of changing the image forming width in the same direction.

Figure 6:
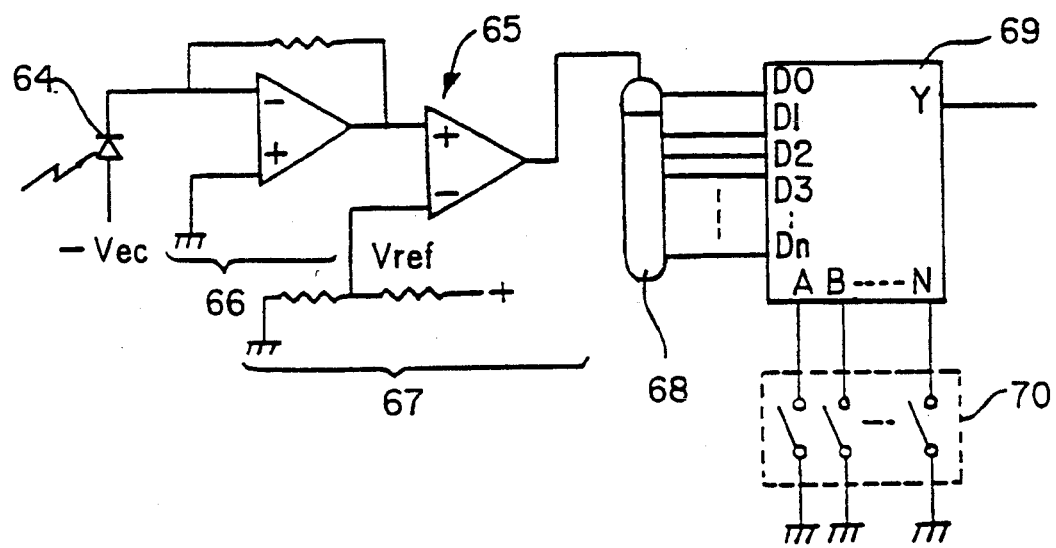
FIG. 6 is a circuit diagram showing a circuit for setting a time for starting exposure and playing the role of image position changing means.

FIG. 6 shows a circuit 65 for setting a time for starting exposure and which is a specific form of the image position changing means of the type moving the image forming position in the main scanning direction. In the deflection scanning type exposing means 13, the sensor 64 for generating a synchronization signal as stated earlier, an amplifying circuit 66 for amplifying the synchronization signal, a waveform shaping circuit 67 for shaping the waveform of the output of the amplifying circuit 66, a delay circuit 68, a data selector 69 having a plurality of delay time data, and a switch section 70 for applying a data selection signal meant for the data selector 69 from the outside are connected, as illustrated.

Figure 7:
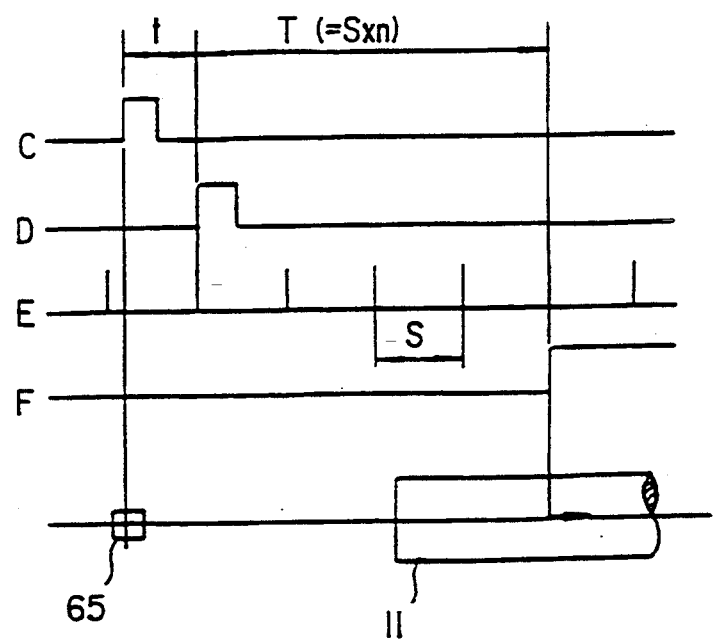
FIG. 7 is a timing chart associated with FIG. 6.

The operation of the circuit 65 will be described with reference to FIG. 7. There are shown in FIG. 7 a synchronization signal C generated by the sensor 64, a signal D produced by delaying the signal C by a period of time t, a video clock E synchronous to the signal D, and an exposure start signal F. The exposure start signal F may be changed by changing the count n of the video clock E having a period S, and the delay time t. Therefore, by taking account of a positional deviation of an image to be formed by the line type exposing means 16 in the main scanning direction, the exposure start signal F may be outputted at a particular time for changing the position of the image in the main scanning direction. This is successful in bringing the images to be formed by the exposing means 13 and 16 into accurate register and, therefore, in insuring a printing free from the deviation of colors.

Figure 8:
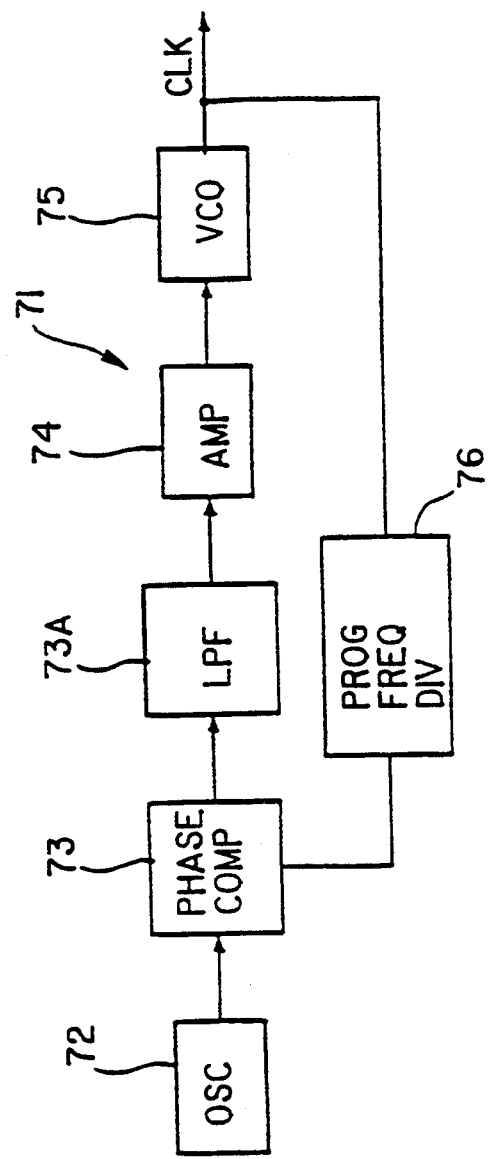
FIG. 8 is a circuit diagram showing an image width changing circuit serving as image position changing means.

FIG. 8 shows a circuit 71 for changing the image forming width and which is a specific form of the image position changing means of the type changing the image forming width in the main scanning direction. As shown, the circuit 71 is implemented as a PLL (Phase Locked Loop) circuit and made up of an oscillator 72, a phase comparator 73, a low pass filter 73a, an amplifier 74, a VCO (Voltage Controlled Oscillator) 75, and a programmable frequency divider 76 connected between the output of the VCO 75 and the phase comparator 73. Assume that the oscillator 72 has an oscillation frequency of $f_o$, and that the programmable frequency divider 76 has a division ratio of $1/N$. Then, the frequency available with a clock CLK is $Nf_o$. Therefore, if the division ratio of the frequency divider 76 is $1/(N+1)$, i.e., data to be applied to the frequency divider 76 is $N+1$, then the frequency of the clock to be produced changes by $(N+1)f_o - Nf_o$. In this manner, by changing the data to be applied to the frequency divider 76, it is possible to change the frequency of the video clock E and, therefore, the image forming width (magnification) in the main scanning direction by each step of $f_o$. Specifically, when the period S of the video clock E is increased, i.e., when the frequency of the video clock E is reduced, the image forming width in the main scanning direction will be increased, and vice versa. This prevents the images to be formed by the exposing means 13 and 16 from deviating from each other.

Figure 9:
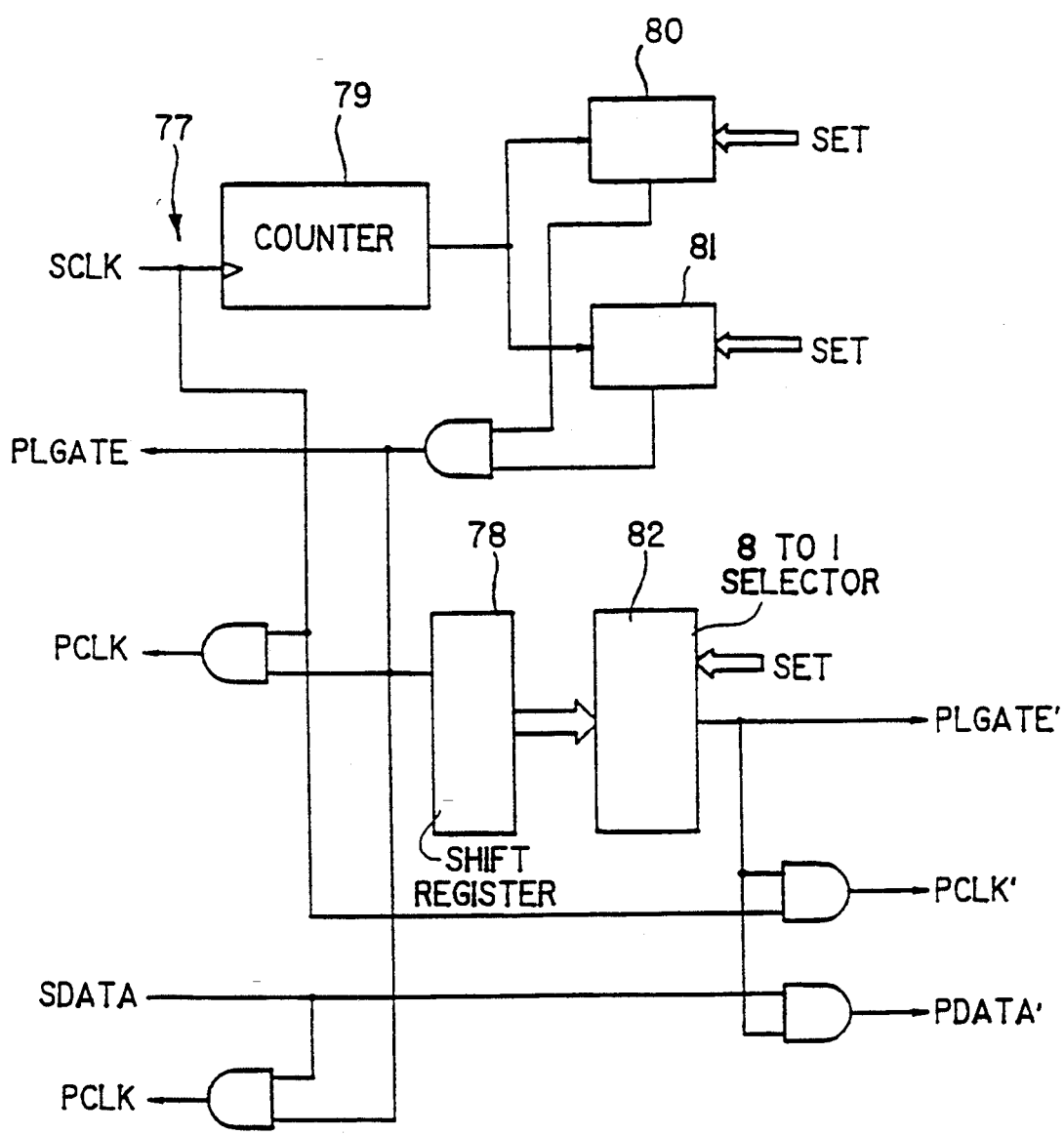
FIG. 9 is a circuit diagram showing a circuit for setting a time for starting exposure and playing the role of image position changing means.
Figure 10:
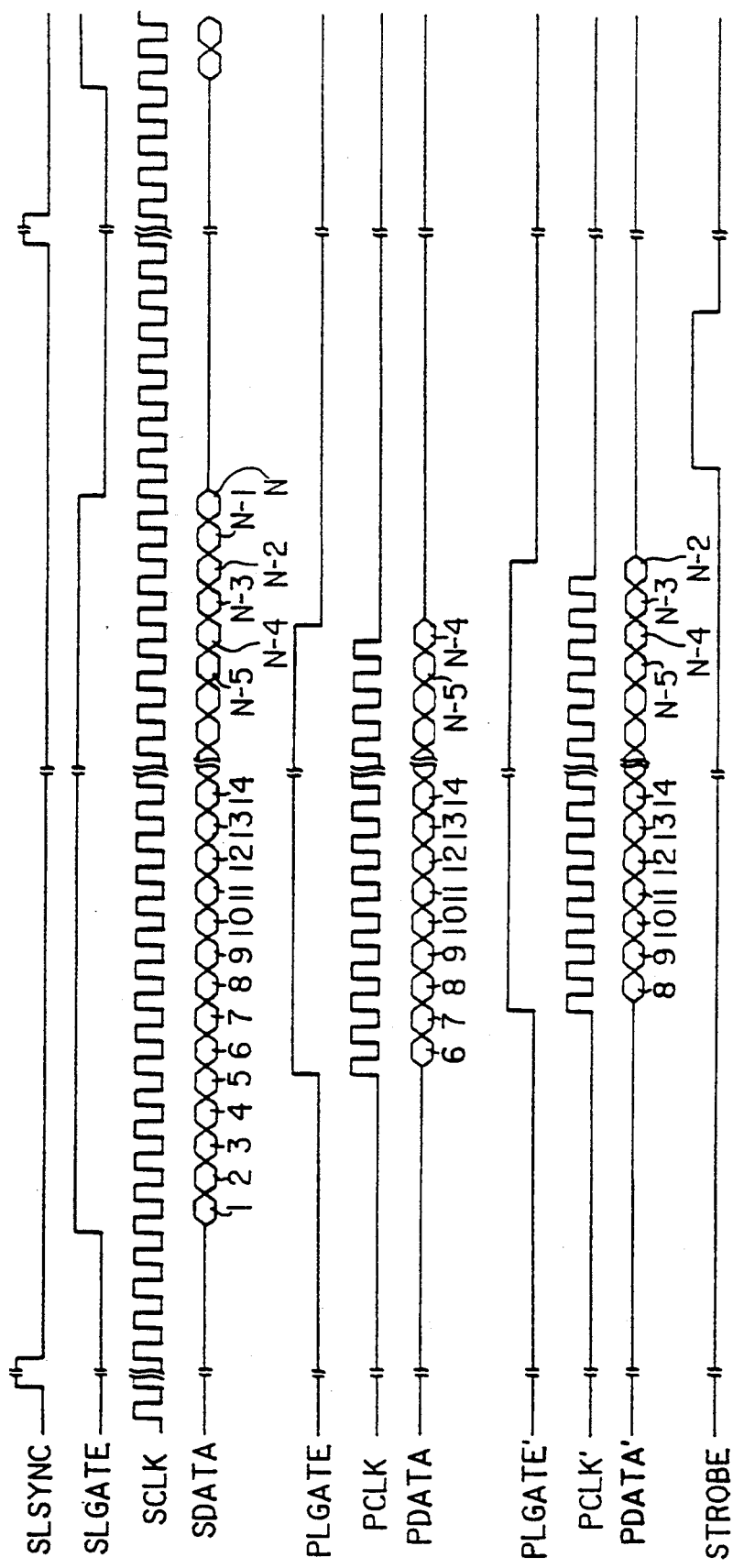
FIG. 10 is a timing chart associated with FIG. 9.

FIGS. 9 and 10 show a circuit 77 for setting an exposure start time and which is a specific form of the image position changing means of the type changing the image forming width in the main scanning direction. How the embodiment operates when the exposure start time of the line type exposing means 16 is deviated relative to that of the deflection scanning type exposing means 13 will be described. The exposing means 16 is controlled by a shift register 78 capable of storing one line of data, and a signal STROBE for energizing the LED array chip 34. The document reading device 3 sends to the circuit 77 a line synchronization signal SLSYNC, an image valid signal SLGATE, a read pixel clock SCLK, and video data SDATA representative of a document image. For printer control, the circuit 77 generates a signal PLGATE matching a paper sheet, and a video clock PCLK which turns on only when the image is valid. With these signals PLGATE and PCLK, the circuit 77 validates only necessary part of the data sent from the document reading device 3 and transfers the valid data to the shift register 78. After one line of data has been written to the shift register 78, the signal STROBE is brought to a high level. Then, the LED array chip 34 turns on to write the image on the photoconductive element 11.

As shown in FIG. 9, the image valid signal PLGATE is generated by a counter 79 to which the read pixel clock SCLK from the document reading device 3 is applied, and comparators 80 and 81, according to the timing shown in FIG. 10.

Assume that the exposure start time of the deflection scanning type exposing means 13 is deviated by a period of time corresponding to two dots. Then, if an 8 to 1 selector 82 shown in FIG. 9 has the set value thereof deviated by two dots, each of the control signals can be shifted by two dots. This produces an image valid signal PLGATE a video clock PCLK', and video data PDATA'. Alternatively, the set values of the comparators 80 and 81 may be changed at the same time so as to bring the exposure start time of the exposing means 16 into coincidence with that of the exposing means 13.

FIGS. 11, FIG. 12A and 12B show another alternative embodiment of the present invention. As shown, the housing 32 of the line type exposing means 16 is mounted on a support member 83 in such a manner as to be movable in the direction of rotation of the drum 11. The support member 83 is affixed to a frame or similar stationary member, not shown. Image position adjusting means 83 is provided for changing the position of the exposing means 16 in the direction of rotation of the drum 11. The image position adjusting means 83 is made up of a leaf spring 85 biasing the bottom of the exposing means 16, and an adjusting screw 86 threaded into the support member 83 and urging the top of the exposing means 16. Such image position adjusting means 84 is located at both sides of the support member 83.

In the above construction, the deviation of images formed by the two exposing means 13 and 16 from each other should not exceed one dot (several tens of microns). The illustrative embodiment can bring an image formed by the exposing means 16 into register with an image formed by the exposing means 13 in the subscanning direction only if the adjusting screw 86 is turned. This is successful in insuring a printing free from color deviation in the subscanning direction. Further, as shown in FIG. 12A, assume that the scanning line formed by the exposing means 16 is inclined relative to the scanning line formed by the exposing means 13. Then, the two scanning lines will become parallel to each other, as shown in FIG. 12B, only if the right and left adjusting screws 86 are operated to displace the associated ends of the exposing means 16.

Figure 14:
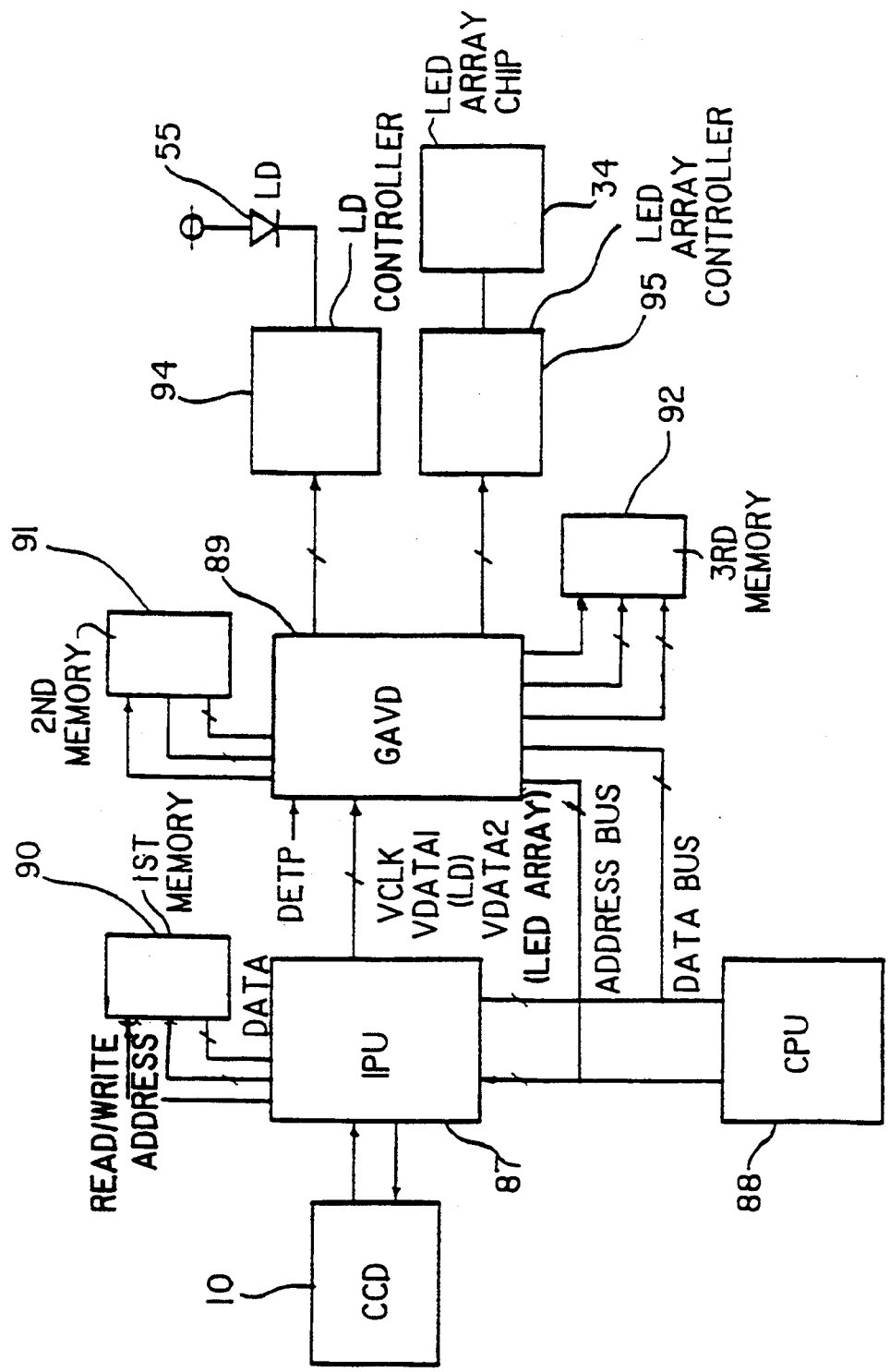
FIG. 14 is a block diagram schematically showing electronic circuitry.

Referring to FIGS. 13–17, another alternative embodiment of the present invention will be described. As shown in FIG. 13, the deflection scanning type exposing means 13 has the sensor 64 for generating the synchronization signal. As shown in FIG. 14, in IPU (Image Processing Unit) 87 is connected to the image sensor 10 of the document reading device 3. The IPU 87, a CPU 88, a GAVD (video modulating section) 89, a first memory 90, a second memory 91 and a third memory 92 are connected by an address bus and a data bus. Connected to the GAVD 89 are an LD controller 94 for controlling the laser diode 55 of the exposing means 13, and an LED array controller 95 for controlling the LED array chip 34 of the exposing means 16.

Figure 15:
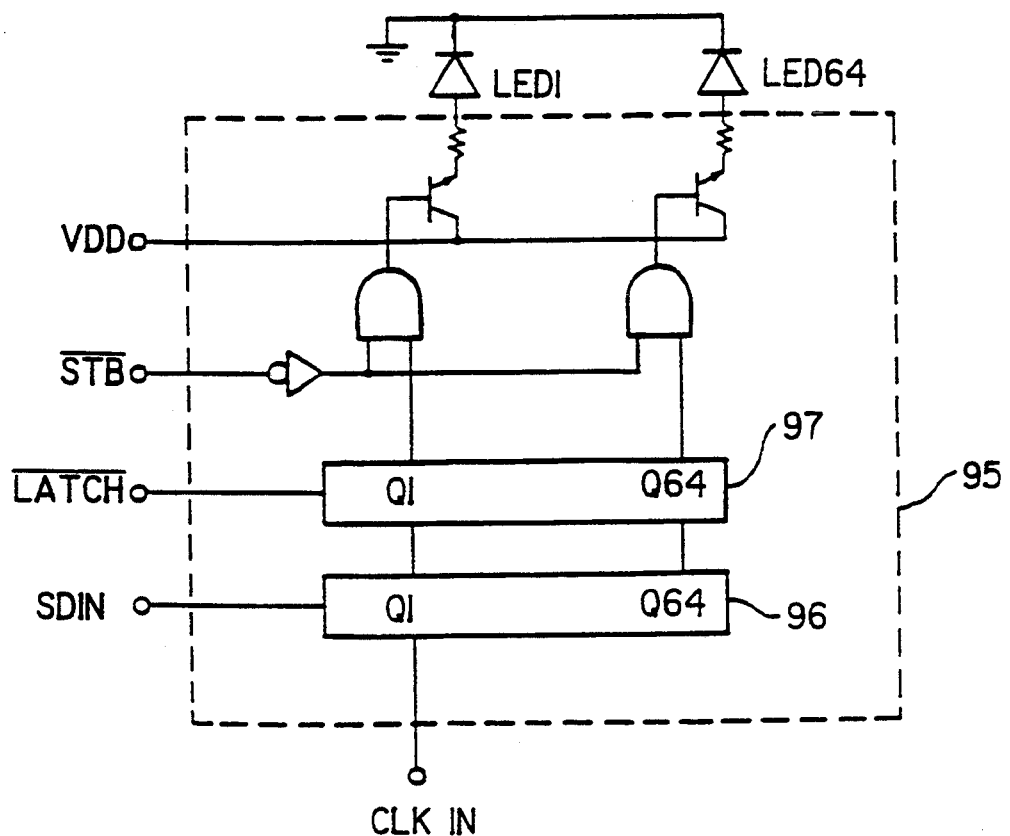
FIG. 15 is a circuit diagram showing an LED (Light Emitting Diode) array control section.

FIG. 15 shows a specific construction of the LED array controller 95. As shown, video data are serially applied to an input SDIN. A video clock is fed to an input CLKIN. The serial video data are transformed to parallel data by a shift register 96 in synchronism with the video clock. In response to an inverted latch signal LATCH, a latch 97 latches the parallel video data. When an inverted strobe signal STB turns from a high level to a low level, the latched parallel data are fed to $LEDs_1$–$LED_{64}$ (see timing chart shown in FIG. 17).

Figure 16:
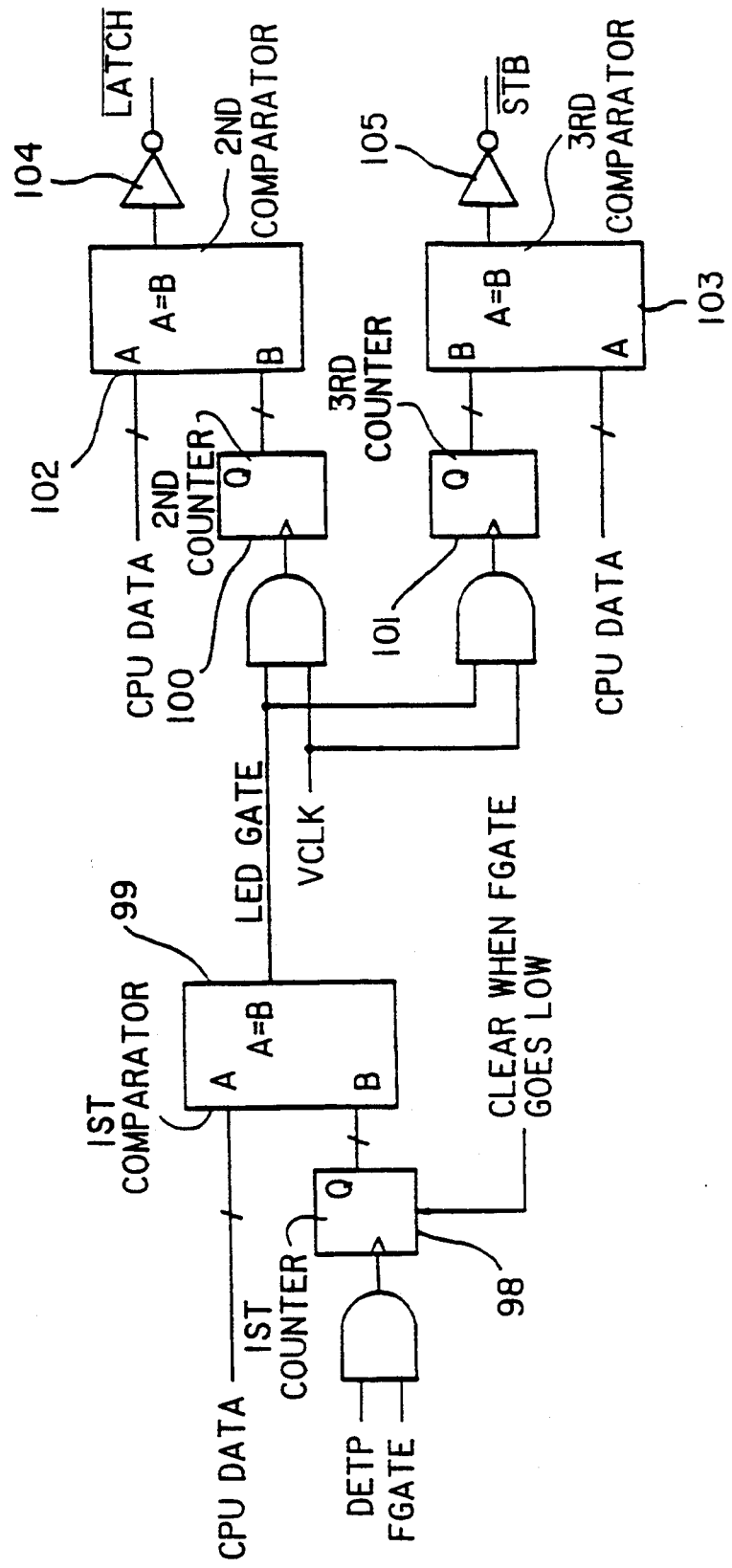
FIG. 16 is a circuit diagram showing an LED array control circuit.
Figure 17:
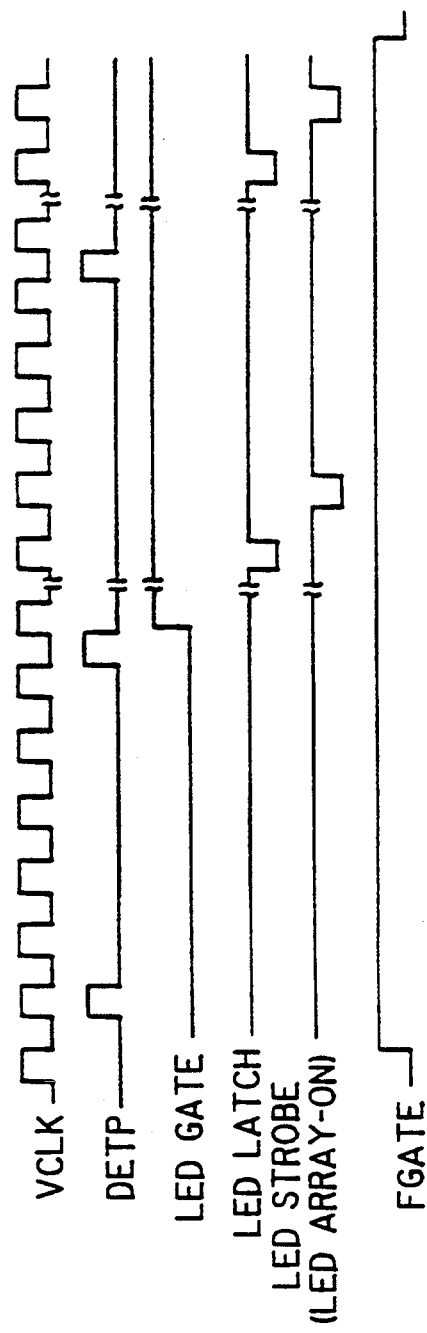
FIG. 17 is a timing chart associated with FIG. 16.

An LED array control circuit included in the GAVD 89 will be described with reference to FIG. 16. As shown, a first counter 98, a first comparator 99, a second and a third counter 100 and 101, a second and a third comparator 102 and 103, and inverters 104 and 105 for inverting the outputs of the comparators 102 and 103, respectively, are connected. When a signal FGATE (subscanning valid period signal) goes high, a synchronization signal DETP from the sensor 64 is applied to the first counter 98. As the count of the counter 98 reaches a predetermined value, the output of the first comparator 99, i.e., the LED gate signal goes high with the result that a clock VCLK is applied to the second counter 100. When the count of the counter 100 reaches a predetermined value set in the CPU 88, the output of the second comparator 102 is inverted by the inverter 104 and then fed to the LED array controller 95 as the inverted signal LATCH. On the change of the LED gate signal to a high level, the clock VCLK is applied to the third counter 101. As the count of the 101 becomes equal to the predetermined value of the CPU 88, the output of the comparator 103 is inverted by the inverter 105 and then fed to the LED array controller 95 as the inverted strobe signal STB, i.e., the output of the LED chip 34 becomes active.

In FIG. 14, black video data and red video data meant for the exposing means 13 and 16, respectively, are stored in the first memory 90 by the IPU 87. The IPU 89 processes the black video data and red video data and converts them to serial data. The serial black data and the serial red data are fed to the GAVD 89 as data VDATA1 and VDATA2, respectively. In response, the GAVD 89 adjusts the reading speed and writing speed by use of memories 91 and 92, manipulates the black video data and delivers the resulting data to the LED controller 94, and generates the inverted latch signal LATCH and inverted strobe signal STB to feed them to the LED array controller 95. In this sense, the GAVD 89 plays the role of drive means for driving the line type exposing means 16 on the basis of the synchronization signal (DEPT) from the deflection scanning type exposing means 13. As a result, the operation of the exposing means 16 is synchronized to that of the exposing means 13 to enhance reliability on a line basis. In addition, the GAVD 89 functions to determine a time for driving the exposing means 16 in response to the synchronization signal DETP. Therefore, it is possible to surely determine the position of the image to be formed by the exposing means 16 in the subscanning direction relative to the image formed by the exposing means 13, eliminating color deviation on a printing in the subscanning direction.

Figure 18:
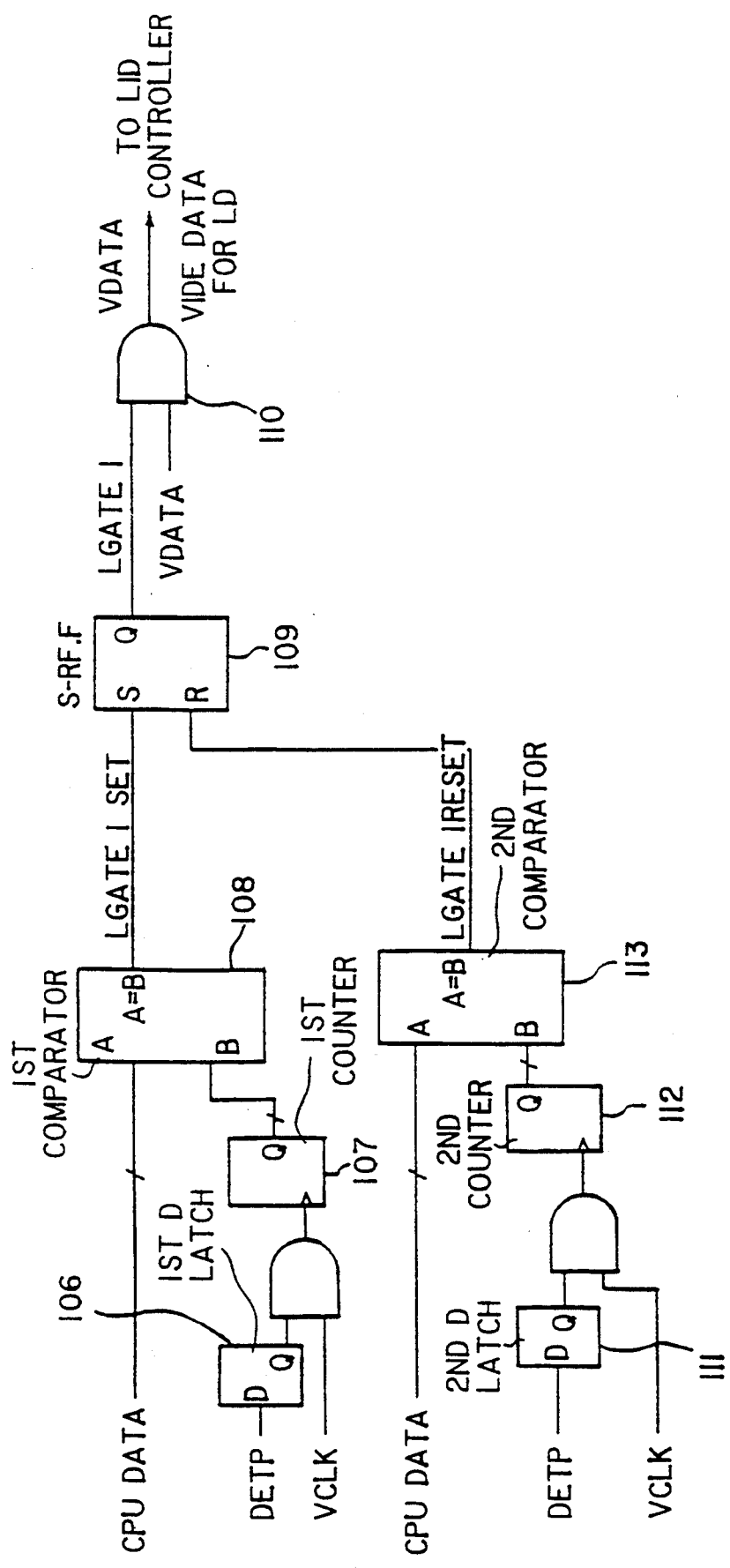
FIG. 18 is a circuit showing an LD (Laser Diode) control circuit representative of another alternative embodiment of the present invention.

Another alternative embodiment of the present invention will be described with reference to FIGS. 13, 14, 18 and 19. FIG. 18 shows a specific construction of an LD control circuit incorporated in the GAVD 89, FIG. 14. As shown, a first D latch 106, a first counter 107, a first comparator 108, a set-reset flip-flop (S-R FF) 109 and an AND gate 110 are sequentially connected. A second D latch 111, a second counter 112 and a second comparator 113 are sequentially connected. The second comparator 113 is connected to the S-R FF 108.

Figure 19:
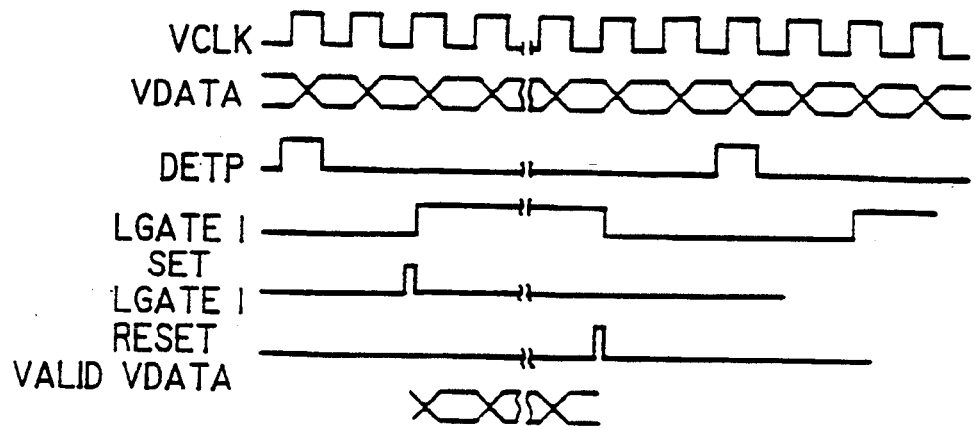
FIG. 19 is a timing chart associated with FIG. 18.

Referring to FIG. 19, when a synchronization signal DETP from the sensor 64 is applied to the first D latch 106, a clock VCLK is fed to the first counter 107. As the count of the counter 107 reaches a predetermined value set in the CPU 88, an LGATE 1 set signal which is the output of the comparator 108 goes high. As a result, an LGATE 1 set signal appearing on the output of the S-R FF 109 becomes a high level. At the same time, the signal VDATA turns from a high level to a low level. This renders the laser diode of the exposing means 13 active. When the output DETP of the sensor 64 is fed to the second D latch 111, the signal VCLK is applied to the second counter 112. As the count of the counter 112 becomes equal to the predetermined value of the CPU 88, an LGATE 1 reset signal appearing on the output of the second comparator 113 goes high. As a result, the LGATE 1 signal from the S-R FF 109 goes low to inhibit the signal VDATA from being outputted, i.e., the exposing means 13 stops exposure.

As described above, the GAVD 89 controls the time for driving the deflection scanning type exposing means 13 in response to the output DETP of the sensor 64. This allows the image writing position of the exposing means 13 in the main scanning direction to be determined with a deviation in the main scanning direction taken into account, insuring a printing without color deviation in the main scanning direction.

Figure 25:
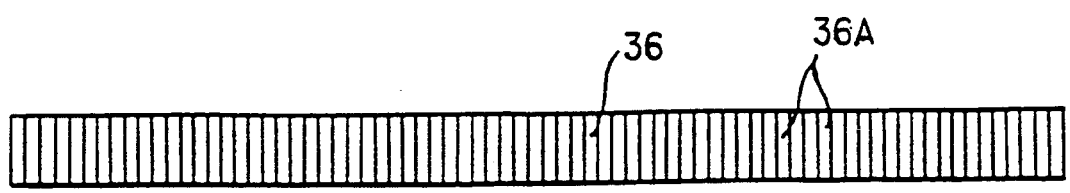
FIG. 25 is a plan view of a conventional rod lens array.
Figure 26:
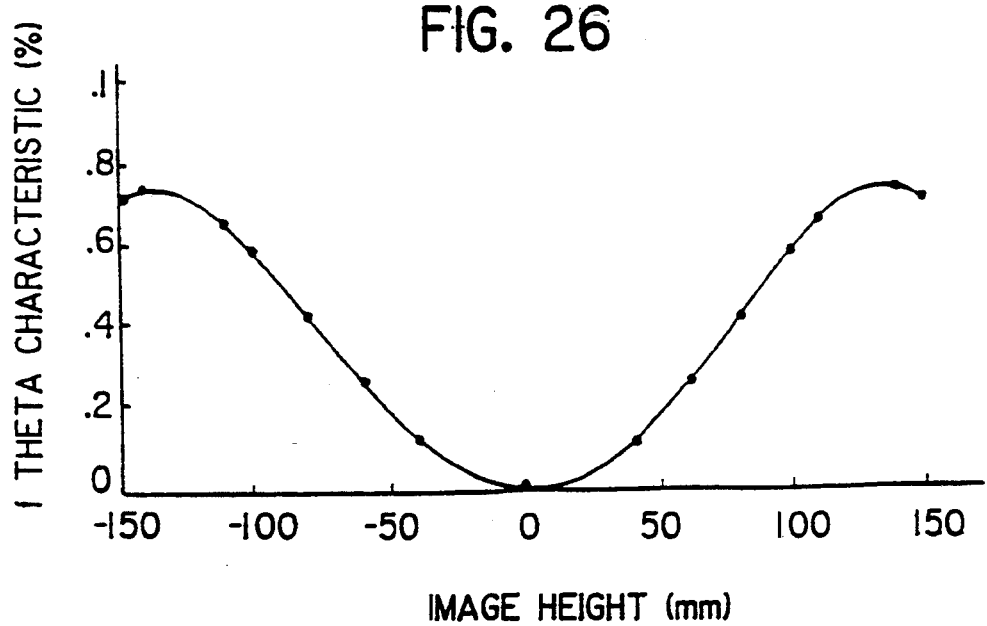
FIG. 26 is a graph indicative of the characteristic of an f-theta lens included in deflection scanning type exposing means.

Another alternative embodiment of the present invention will be described with reference to FIGS. 20 and 21. As shown in FIG. 25, the conventional line type exposing means 16 has a rod lens array 36, i.e., a parallel array of a number of lenses 36a; parallel beams are incident on the drum 11. On the other hand, as shown in FIG. 26, the f-theta lens 57 of the deflection scanning type exposing means 13 has a characteristic which sequentially increases from, for example, a position where the image height is zero, i e., the center of an image toward the periphery of the image. It follows that although the document reading device 3 may read an image at equal intervals, the scanning pitch as measured on the drum 11 sequentially increases from the center toward opposite ends. The ratio of the scanning pitch at opposite ends to the scanning pitch at the center is referred to as a linearity. As the linearity increases, the deviation of the images formed by the exposing means 13 and 16 from each other increases, resulting in color deviation on a printing.

Figure 20:
FIG. 20 is a plan view of a rod lens array representative of another alternative embodiment of the present invention.
Figure 21:
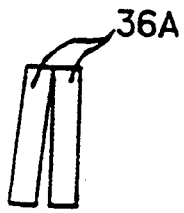
FIG. 21 is a plan view showing part of the rod lens array.

As shown in FIGS. 20 and 21, the illustrative embodiment implements the line type scanning means 16 with a rod lens array 36 having a number of lenses 36 arranged in a sector in matching relation to the characteristic of the f-theta lens 57. It should be noted that the lenses 36a are arranged at a greater pitch at the drum 11 side than at the LED array chip 34 side. With such a configuration, the embodiment successfully brings an image formed by the line type exposing means 16 into register with an image formed by the exposing means 16 despite that the latter may be compressed or expanded in the main scanning direction due to the f-theta characteristic. Since the lenses 36a are arranged at a greater pitch at the drum 11 side than at the LED array chip 34 side, as mentioned above, the light from the exposing means 16 can reach the drum 11 with a certain spread matching the f-theta characteristic of the exposing means 13, freeing a printing from color deviation. Alternatively, the density in which the lenses 36a are arranged may be sequentially reduced from the center to opposite ends of the rod lens array 36. This is also successful in providing the light from the exposing means 16 with the above-mentioned spread.

Next, described are embodiments of the line type exposing means 16 and structure for preventing dirt in the second main charger 15 (the charger will be used below). Generally speaking, as many light sources are lighted continuously in the line type exposing means 16, the lighting efficiency becomes lower Also the charger 15 adjacent to the line type exposing means 16 is polluted by the toner spread around the photoconductive element 11. The purpose of the following embodiments is to prevent these problems.

Figure 27:
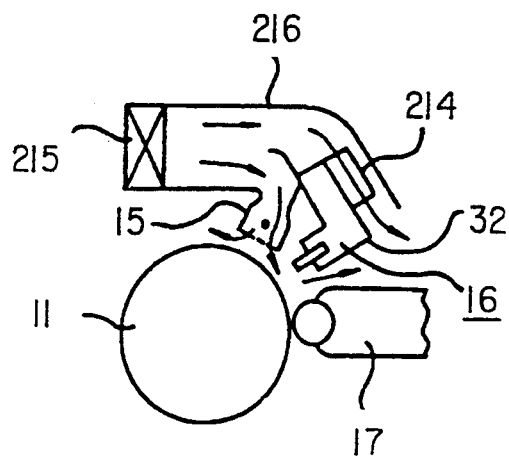
FIG. 27 is a sectional side view of an embodiment of a charging and LED array exposing means provided with a fan.

A first embodiment is shown in FIG. 27. A heat sink fin 214 is installed in the back side of the housing 32 of the line type exposing means 16 close to the charger 15. An air flow guide 216 is installed so that the air flow generated by a fan 215 can be divided into flow through the charger 15 and flow through and past the heat sink fin 214.

In such a structure, the air flow generated by the fan 215 is channelled by the air flow guide 216 to flow from the back side of the charger 15 to the photoconductive element through and around the charger 15, whereby the toner adhered to the charger 15 is removed. The air flow guide 216 divides the air flow into a second stream which flows through and around the fin 214. Even though the LED array chip of the line type exposing means generates heat by its lighting, it can be cooled by the air flow. As a result, it is unnecessary to prevent temperature increase by otherwise reducing the lighting efficiency and decreasing the duty, and therefore the lighting efficiency can be higher.

Now the line type exposing means 16 is installed close to the first developing means which develops the latent image formed by the deflection scanning type exposing means. When the first developing means 14 is installed above the line type exposing means 16, a board is installed between the line type exposing means 16 and the first developing means 14 to interrupt the toner which is spread from the first developing means 14. Therefore the pollution of the line type exposing means 16 by the toner can be prevented. Also when the board is installed between the charger 15 and the first developing means 14, the pollution of the charger 15 by the toner which is spread from the first developing means 14 can be prevented. Also as mentioned above, since the line type exposing means 16 is not used frequently because it forms the red binary image, it can be kept apart from the photoconductive element 11 when it is not used. Therefore the pollution of the line type exposing means 16 can be prevented.

Figure 28:
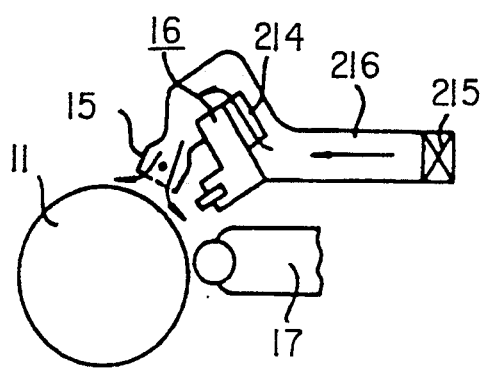
FIG. 28 is a sectional side view of another embodiment of a charging and LED array exposing means provided with a fan.

Next, a second embodiment is shown in FIG. 28. In this embodiment, the same numerals are used to designate the same parts as described in relation to FIG. 27. In this embodiment, the fan 215 is installed at the back side of the line type exposing means 16. Therefore the air flow generated by the fan 215 goes to the line type exposing means 16 and the charger 15 by an air flow guide 216 and then it is exhausted to the photoconductive element 11. Accordingly, the same result as that in FIG. 27 can be obtained.

Figure 29:
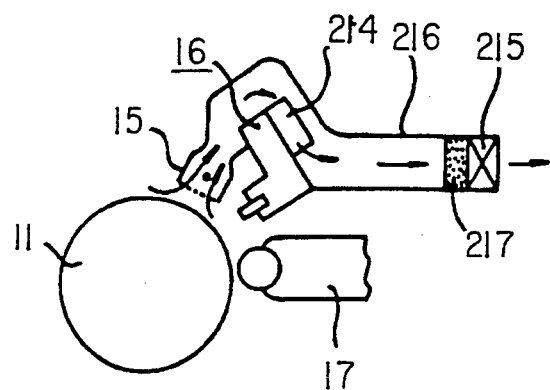
FIG. 29 is a sectional side view of an embodiment of a charging and LED array exposing means provided with a fan and a filter.

A third embodiment is shown in FIG. 29. The fan 215 is installed in the back side of the line type exposing means 16 so as to draw in the air flow from the photoconductive element 11 and a filter 217 is installed in contact with the fan 215. The air flows from the photoconductive element 11 to the charger 15 and then to the line type exposing means 16. Therefore the line type exposing means 16 can be cooled by the air flow. In this case, as the air flow including ozone generated by the charger 15 is warmed by the heat of the line type exposing means 16, the ozone can be absorbed efficiently by the filter 217. Moreover as the ozone is warmed more, it can be absorbed and resolved better.

Now in FIG. 27, if the direction of the fan 215 is reversed and the air flow is drawn in from the outside of the line type exposing means 16, the line type exposing means 16 can be cooled by this structure. In this case, as the air flow is warmed in the line type exposing means 16 and mixed with the air flow from the charger 15 before the fan 215, the ozone is warmed. Therefore the ozone is promoted to be absorbed and resolved by installing the filter 217 before the fan 215.

Figure 30:
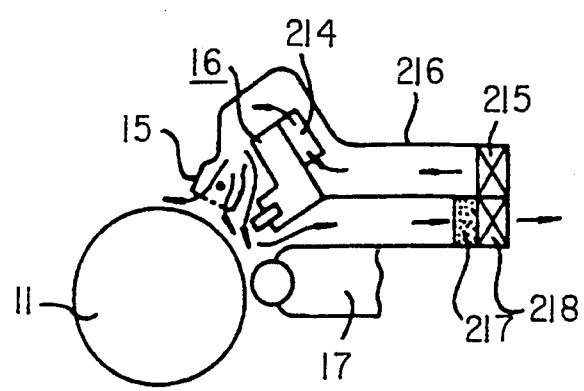
FIG. 30 is a sectional side view of another embodiment of a charging and LED array exposing means provided with a fan and a filter.

A fourth embodiment is shown in FIG. 30. In the back side of the line type exposing means 16, the fan 215 which supplies air flow to the line type exposing means 16 and a fan 218 which draws in air flow from the line type exposing means 16, are installed. The filter 217 is installed before the fan 218. Then the air flow from the fan 215 is guided to the line type exposing means 16 and the charger 15 by the air flow guide 216 and is exhausted to the photoconductive element 11. Also the air flow drawn in from the photoconductive element 11 is guided to the line type exposing means 16 and is exhausted to the outside via the filter 217.

In FIG. 30, as the fan 215 supplying the air flow and the fan 218 drawing out the air flow are operated at the same time, the air flow speed can be faster. Therefore the air flow including the ozone generated in the charger 15 can be corrected efficiently and the dirt of the line type exposing means 16 can be prevented. Also the spread toner and ozone can be absorbed by the filter 217, dirt formation inside the apparatus can be prevented, and the amount of ozone which is exhausted to the outside can be reduced. Moreover if the drawing in fan 218 has higher capacity than the supplying fan 215, the presence of toner dirt and/or ozone between the line type exposing means 16 and the charger 15 can be prevented.

In the above embodiment, though the filter 217 is used for absorbing and resolving the ozone, toner and etc., a chemical can be used instead of the filter 217.

Moreover though one of the purposes of the present invention is to make the whole apparatus smaller size by use of the line type exposing means 16, some embodiments in which the line type exposing means and the charger are installed in one unit will be described so as to promote the smaller size.

Figure 31:
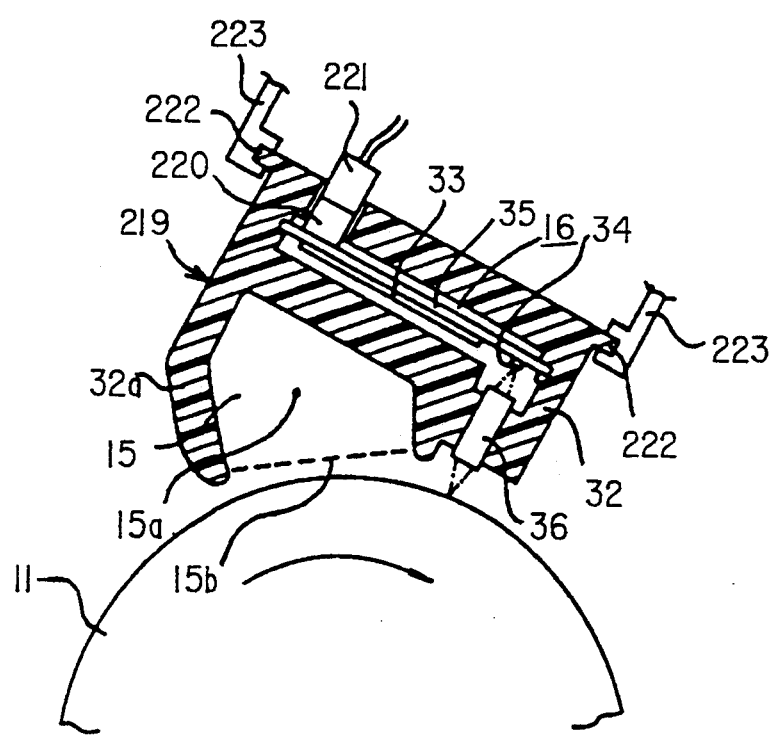
FIG. 31 is a sectional side view of an embodiment of a charging and LED array exposing means.
Figure 32:
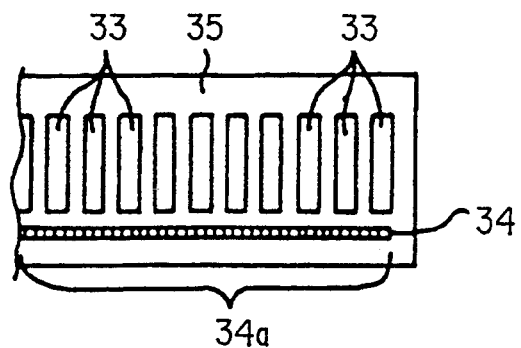
FIG. 32 is a sectional front view of LED array chips and drive circuits for LED array chips.

First of all, a fifth embodiment is shown in FIGS. 31 and 32. A charging and exposing means 219 is composed of the charger 15 and the line type exposing means 16. That is, LED array chip 34 and IC drive circuit for driving the LED array chip are formed on an insulating substrate composed of a ceramic material such as alumina. The substrate and the rod lens array are supported in the housing 32 which is formed of an insulating material. The charger having the wire 15a and the grid 15b are installed within the supporting block 32a formed in the housing 32. Also a connector 220 which is connected to the board 35 is connected to a connector 221 of a power supply. Moreover ribs 222 are formed along the both sides of the housing 32 and holding members 223 are installed so as to slidably hold the ribs 222. That is, the charging and exposing means 119 is held movably in the direction of the shaft of the photoconductive element 11. Also as shown in FIG. 32, the LED array chip 34 is composed of plural LEDs 34a which are arranged straightly along the edge of the substrate and the IC drive circuit 33 for driving LEDs is arranged in the center of the board 35.

By the way, the optical conjugate length of the rod array lens 36 for converging the light from the LED array chip to the surface of the photoconductive element 11 needs some distance. Therefore though the space between the substrate on which LED array chip is installed and the photoconductive element 11 is the optical conjugate length, in this embodiment the IC drive circuit 33 etc. which does not need a wide installation space is arranged besides the LED array chip 34 and the charger 15 is installed in the dead space between the IC drive circuit 33 and the photoconductive element 11. As a result, the width of the charging and exposing means 219 can be smaller in the direction of circumference of the photoconductive element 11. Also as the charger 15 and the line type exposing means 16 are held in one housing 32, the number of parts can be reduced. Thus, the whole apparatus can be promoted to be a further smaller size.

Figure 33:
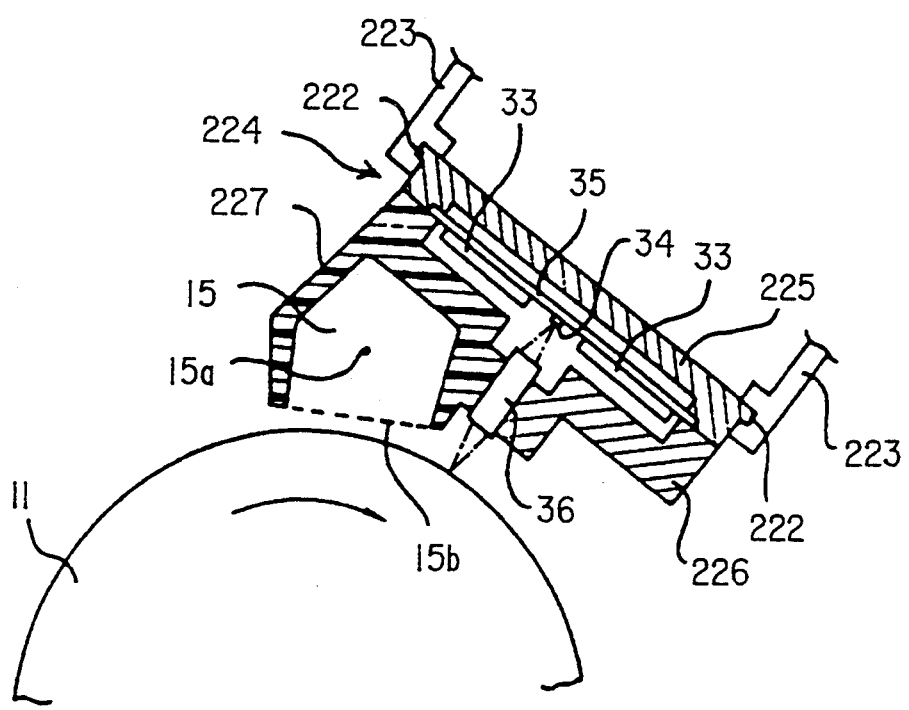
FIG. 33 is a sectional side view of another embodiment of a charging and LED array exposing means.

Next, a sixth embodiment is shown in FIG. 33. In this embodiment, the same numerals are used to designate the same parts as that in FIG. 31 and 32 and the description of these parts will be omitted. In this embodiment, a charger and exposing means 224 is composed of metal cases 225 and 226 for holding the substrate on which the LED array chip 34 and the IC drive circuit 33 are formed, and an insulation case 227 of the charger etc., in one body. The rod array lens 36 is held by the metal case 226 and the insulation case 227. Also the LED array chip 34 is installed in the center of the board 35 and the IC drive circuit 33 is arranged at both sides of the board 35. The metal cases 225, 226 are formed of a metal which is excellent to manufacture and which radiates heat.

Accordingly, a smaller size can be achieved as well as that achieved in FIG. 31. Also the heat of the board 35 is radiated efficiently by the metal cases which have efficient heat radiation. Moreover as the charger 15 is covered by the insulation case, the metal cases are not charged if high voltage is input to the wire 15a. As a result, driving the LED array chip is not affected adversely.

Figure 34:
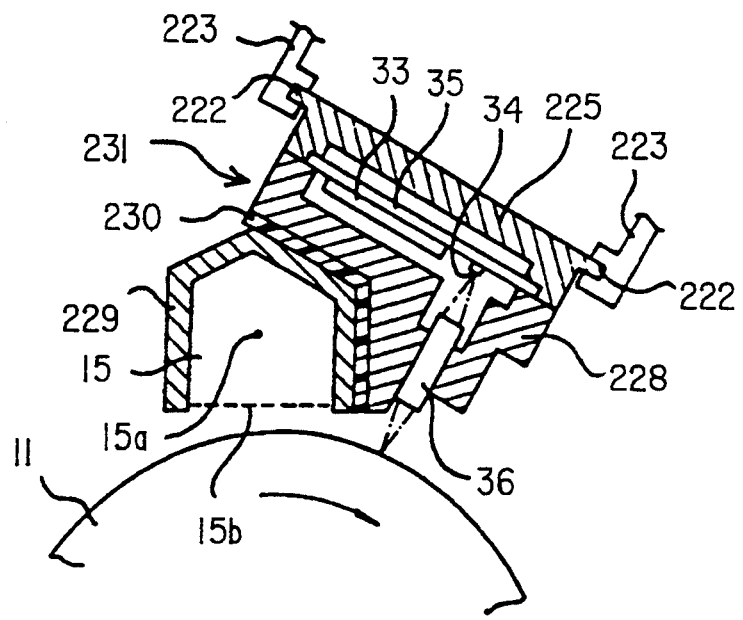
FIG. 34 is a sectional side view of another embodiment of a charging and LED array exposing means.

A seventh embodiment is shown in FIG. 34. In this embodiment, a charging and exposing means 231 is composed of a metal case 225 for holding the board 35 on which the LED array chip 34 and the IC drive circuit 33 are formed, and a metal case 228 for holding the rod lens array 36 are combined via a insulation 230. They are combined by an adhesive layer which is formed on the both sides of the insulation 230. Alternatively the insulation 230 can be secured to the case 228 by insulated screws. Therefore even if the high voltage is input to the wire 15a, the metal cases 225 and 228 are not charged. Thus driving the LED array chip is not affected adversely.

Figure 35:
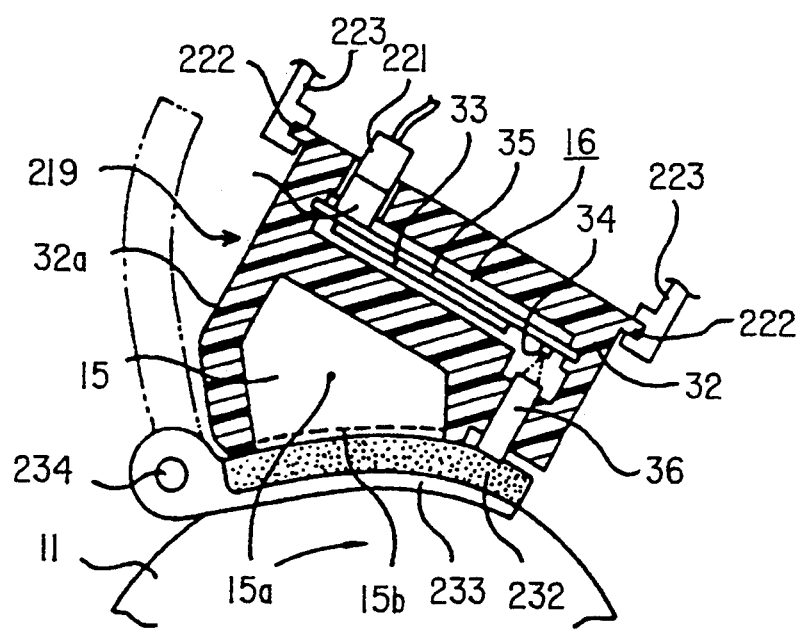
FIG. 35 is a sectional side view of an embodiment of a charging and LED array exposing means with a cleaning means.

A eighth embodiment is shown in FIG. 35. In this embodiment, a cleaning member 232 is installed in the charging and exposing means 219 as shown in FIG. 31. That is, a supporting member 233 is pivotably mounted on a shaft 234 close to the photoconductive element 11 and a cleaning member 232 of soft material is fixed on this supporting member 233.

Accordingly, when the charging and exposing means 219 is drawn out from the holding member 223, the dirt of the toner etc. which is adhered to the rod lens array 36 and the grid 15b can be cleaned by the cleaning member 232. Also as shown by an imaginary line, when the supporting member 233 is pivoted in the upper direction as the center of the shaft 234, the photoconductive element 11 can be drawn out during maintaining. Now if the grid 15b does not exist, the cleaning member 232 can be abutted to the wire 15a.

Figure 36:
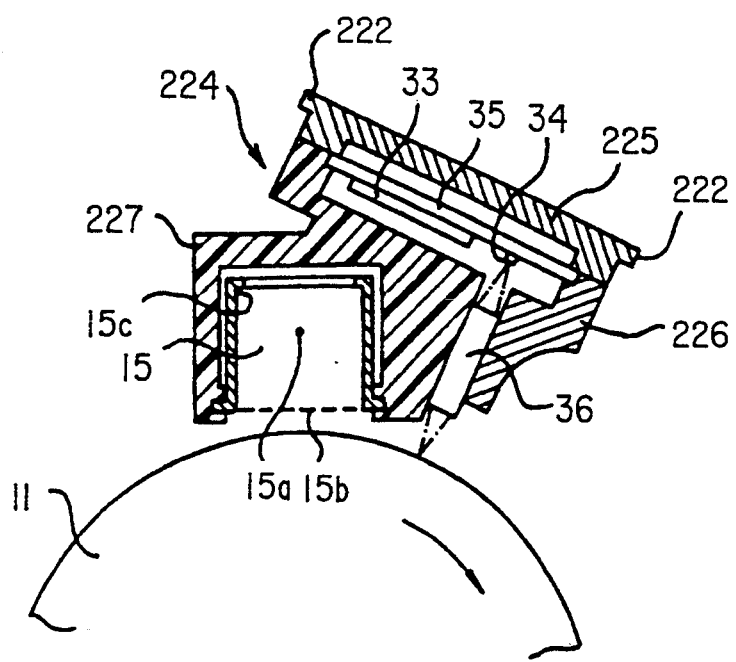
FIG. 36 is a sectional side view of another embodiment of a charging and LED array exposing means.
Figure 37:
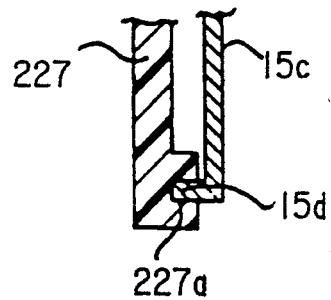
FIG. 37 is a sectional side view illustrating connection of an insulation case and a metal case in FIG. 36.

A ninth embodiment is shown in FIGS. 36 and 37. In this embodiment, the charging and exposing means 224 is basically the same as that of FIG. 33. The difference is that the LED array chip 34 is arranged beside the center of the board, the IC drive circuit 33 on the other side and a metal case 15c of the charger 15 is installed movably inside the insulation case 227. That is, ribs 15d which are folded in the outside direction are formed in both lower sides of the metal case 15c and grooves 227a which hold the ribs 15b movably are formed in the lower-inside of the insulation case 227.

Therefore the charging and exposing means 224 can be drawn in from the holding means 223 as mentioned above during maintaining and exchanging parts. Also when the charger 15 only is cleaned, the metal case 15c, the wire 15a and the grid 15b can be drawn in from the insulation case 227. Thus the maintenance is made easier.

Figure 38:
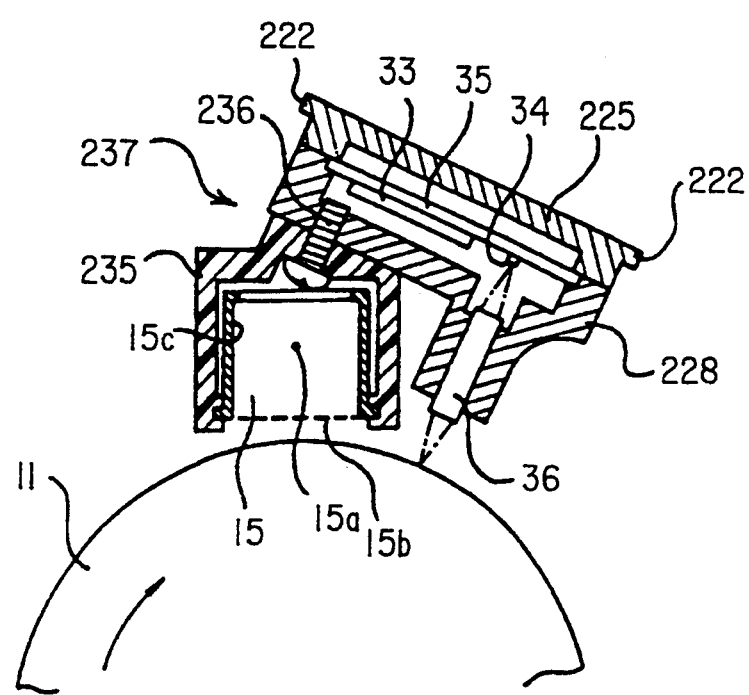
FIG. 38 is a sectional side view of another embodiment of a charging and LED array exposing means.

A tenth embodiment is shown in FIG. 38. In this embodiment, a charging and exposing means 237 is composed of the metal case 225 for holding the board 35 on which the LED array chip and the IC drive circuit are mounted, and the metal case 228 for holding the rod array lens 36, and the cases are combined. A holding case 235 for holding the charger 15 and the metal case 228 are combined by a screw 36. The metal case 15c of the charger 15 is movably installed in the holding case 235. The structure drawing in the metal case 15c is same as that in FIGS. 36 and 37.

As a result, the charger can be drawn in alone like in the embodiment of FIG. 36 during maintaining. Also if the holding case 235 is made of insulating material, even if high voltage is input to the wire 15a, the metal cases 225 and 228 are not charged. Thus driving the LED array chip cannot be affected adversely.

Also as the housing structure of the charger and exposing means 237 is divided into the metal cases and the holding case 235, those forms are easily changed. Moreover when the same LED array chip is used in a printer which has a different printing speed, the width of the charger 15 in correspondence with the line speed (the charge width of the photoconductive element) needs to be changed. But according to this embodiment, as only the holding case and the charger need be changed, a cost saving can be achieved.

Moreover generally speaking, the air flow needs to be generated around the charger so as to prevent accumulation of the dirt of the toner and the presence of ozone and to dissipate heat generated in the LED array chip. As the holding members for holding the charger and the line type exposing means are installed, respectively, in the prior art, it is hard to design the structure so as to flow air toward the charger and the LED array chip. But in the embodiment as shown in FIG. 37 and 38, as the charger 15 and the line type exposing means 16 can be held in one housing, it is easy to design the structure of a housing which has space for putting the charger in and space for putting the line type exposing means in.

Further the units around the photoconductive element 11 need to be installed close to one another so as to promote smaller size using the line type exposing means 16. Because the lighting face of the line type exposing means 16 is close to the photoconductive body, toner adheres to the lighting face easily. If the toner adheres to the lighting face of the line type exposing means 16 (the edge of the rod lens array), nonuniformity of lighting occurs and the image quality will be lower. Also as the toner adheres to the wire 15a of the charger 15 easily, nonuniformity of charging occurs. Thus, embodiments of cleaning devices for cleaning the wire 15a of the line type exposing means and the charger 15 will be described.

Figure 39A:
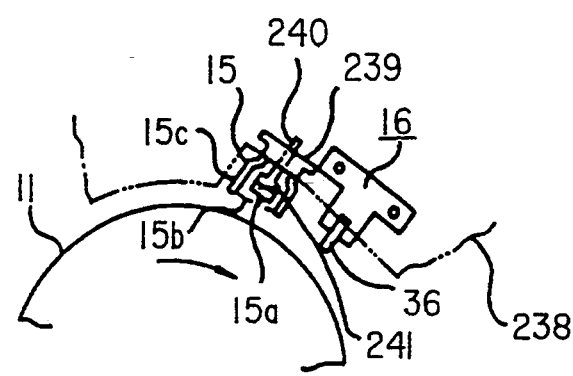
FIG. 39a is a sectional side view of an embodiment of a charging and LED array exposing mean as seen from a front end of the photoconductive element 11.

First of all, an eleventh embodiment is shown in FIGS. 39(a), 39(b), 39(c), 40(a) and 40(b). FIG. 39(a) shows a view from the front of the photoconductive element 11. In FIG. 39(a), side boards 238 are installed parallel to the side faces of the photoconductive element 11. In the side boards 238, a holding member 239 for holding the line type exposing means 16 and the charger 15 is held and can be drawn in the direction of the shaft of the photoconductive element 11. A stick-shaped supporting member 240 is fixed at one side board. This supporting member 240 extends from the opening (not shown) formed on the upper face of the holding member 239 to the inside of the metal case 15c and a cleaning member 241 which abuts the wire 15a is fixed at its edge.

Figure 39B:
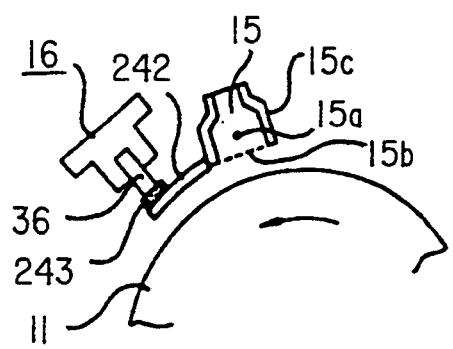
FIG. 39b is a sectional side view of the structure of FIG. 39a provided with cleaning means as seen from a back end of the photoconductive element 11.

FIG. 39(b) shows a view from the back of the photoconductive element 11. In FIG. 39(b), an arm 242 which extends to the line type exposing means 16 is fixed at the back side of the charger 15. In the arm 242, a cleaning member 243 which abuts to the edge.

Figure 39C:
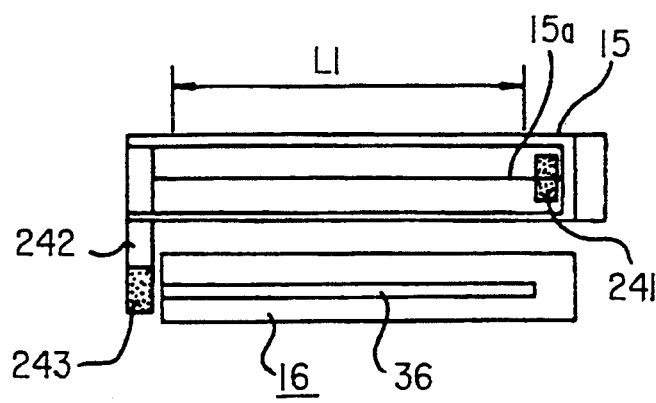
FIG. 39c is the sectional front view of a structure of cleaning means in the embodiment of FIGS. 39a and 39b.

FIG. 39(c) shows a view of the charger 15 and the line type exposing means 16 from the bottom of the photoconductive element 11. In FIG. 39(c), the length of the wire 15a and that of the rod lens array are longer than the width L1 of the photoconductive element 11 (the width of the image).

Figure 40A:
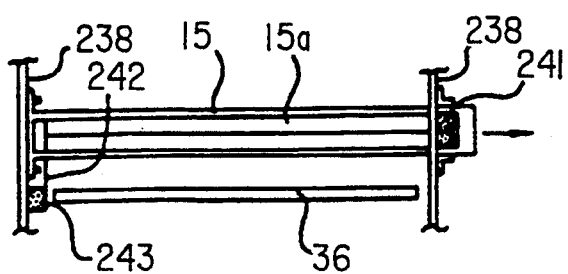
FIGS. 40a and 40b are detailed sectional front views of a structure of the cleaning means shown in FIG. 39.
Figure 40B:
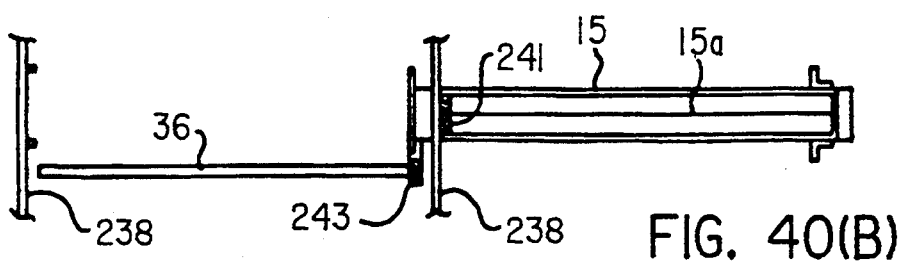

FIG. 40(a) shows a top view of the charger 15 and FIG. 40(b) shows this top view where the charger has been drawn out in the front direction. When the charger is drawn out as shown in FIG. 40(b), as the fixed cleaning member 241 touches the wire 15a, the toner etc. which are adhered to the wire 15a are cleaned. At this time, as a fixed cleaning member 243 touches the edge of the rod lens array 36, the toner etc. adhered to the rod lens array 36 is removed.

Figure 41:
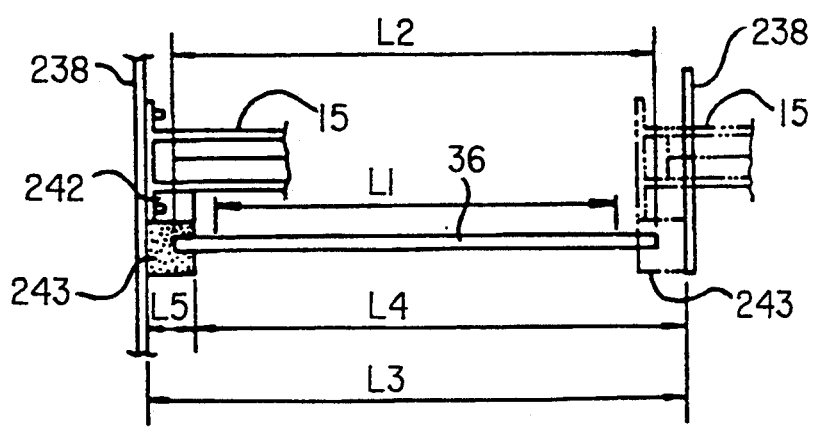
FIG. 41 is a sectional front view of another embodiment of a structure of cleaning means.

Next, a twelfth embodiment is shown in FIG. 41. In this embodiment, the same numerals are used to identify the same parts shown in FIG. 39(a)–39(b) and 40(a)–40(b) and the description of these parts will be omitted. The length L2 of the rod lens array is longer than the length L1 of the photoconductive element 11 so that one edge of the rod lens array 36 can touch the cleaning member 243. Now L3 indicates the space of the boards, 238, L4 indicates the moving amount of the cleaning member 243 and L5 indicates the width of the cleaning member, in which L4+L5 equals to L3.

In this structure, the cleaning member 243 is located outside the image area while the charger 15 is installed. Also at this time, the cleaning member 243 always abuts the edge of the rod lens array 36. Therefore when the charger 15 is drawn in, as the cleaning member 243 also does not move and is fixedly maintained, the lifetime of the cleaning member 243 can be increased.

Now when the transparent protection cover to the lighting face of the line type exposing means 16 is installed, the cover can be cleaned by the cleaning member 243.

In summary, the present invention provides an image forming apparatus having various unprecedented advantages, as enumerated below.

(1) Parts around a photoconductive element are arranged with ease to promote the miniaturization of the apparatus. This stems from the principle that the image quality may be enhanced for an image of particular color and may be lowered for an image of another color expected to be printed less frequently. Specifically, the apparatus has deflection scanning type exposing means for forming the image of particular color, and line type exposing means which has an inherently long optical path and simple structure for forming the image of another color.

(2) Based on the above principle, the line type exposing means has the number of tones thereof per dot reduced to thereby reduce the required capacity of a memory for storing video data and, therefore, the cost of the apparatus.

(3) Based on the above principle, the pixel density of the line type exposing means is reduced. This is also successful in reducing the required capacity of a memory and, therefore, the cost.

(4) The simple line type exposing means promotes easy arrangement of parts around the photoconductive element and, therefore, the miniaturization of the apparatus. Image position changing means brings images formed by the two different types of exposing means into register with each other in the main scanning direction, insuring a printing without color deviation in the main scanning direction.

(5) An angle adjusting mechanism is provided for inclining the line type exposing means relative to the axis of the photoconductive element, so that the image forming width of the exposing means may be changed in the main scanning direction. Therefore, images formed by the two different types of exposing means coincide with each other in the main scanning direction, whereby a printing without color deviation is insured. Since the angle adjusting mechanism has a simple structure and is a mechanical implementation, it realizes simple image position changing means.

(6) The angle adjusting mechanism displaces, among the constituents of the line type exposing means, a base plate supporting light emitting elements or an optical shutter angularly relative to the axis of the photoconductive element. With such a mechanism, it is possible to adjust the image forming width of the line type exposing means in the main scanning direction.

(7) Path length adjusting means is provided for adjusting the length of an optical path extending from a deflector to the photoconductive element, i.e., the image position of the deflection scanning type exposing means in the main scanning direction. This also insures a printing without color deviation in the main scanning direction. Since the path length adjusting means is implemented as a simple mechanical implementation, it constitutes simple image position changing means.

(8) Image position adjusting means is provided for displacing the line type exposing means in the direction of rotation of the photoconductive element. With such a simple structure, it is possible to bring images formed by the two different types of exposing means into register and, therefore, to insure a printing free from color deviation in the subscanning direction.

(9) Image position adjusting means is provided for displacing the opposite ends of the line type exposing means in the direction of rotation of the photoconductive element. With such means, not only the advantage (8) stated above is achieved, but also a scanning line formed by the line type exposing means is surely held parallel to a scanning line formed by the deflection scanning type exposing means.

(10) The line type exposing means is driven on the basis of a synchronization signal generated by the deflection scanning type exposing means. Hence, the operation of the line type scanning means is synchronized to that of the deflection scanning type exposing means, whereby reliability is enhanced on a line basis.

(11) The time for driving the line type exposing means is controlled by a line type exposing means control section on the basis of the synchronization signal from the deflection type exposing means. This allows an image formed by the line type exposing means to be accurately position in the subscanning direction relative to an image formed by the deflection scanning type exposing means. Therefore, the resulting printing is free from color deviation in the subscanning direction.

(12) The time for driving the deflection scanning type exposing means is controlled by a deflection scanning type exposing means control section on the basis of the synchronization signal from the exposing means. This allows an image writing position of this type of exposing means in the main scanning direction to be determined with a deviation of the image position of the line type exposing means taken into account. Hence, the resulting printing is free from color deviation in the main scanning direction.

(13) Lenses included in the line type exposing means are arranged in a sector in matching relation to the characteristic of an f-theta lens included in the deflection scanning type exposing means. Hence, although an image may be compressed or expanded in the main scanning direction due to the f-theta characteristic of the deflection scanning type exposing means, an image formed by the line type exposing means is surely brought into register with such an image.

(14) The lenses are arranged at a greater pitch at the photoconductive element side than at the light emitting element side. Hence, light from the light emitting elements of the line type exposing means can be incident to the photoconductive element with a spread matching the f-theta characteristic of the deflection scanning type exposing means. This is also successful in achieving the above advantage (13).

(15) The lenses are arranged in a density which sequentially decreases from the center toward opposite ends. Then, the light from the light emitting elements can also be provided with a spread matching the f-theta characteristic, achieving the above advantage (13).

(16) The air flow which is generated by one air flow generating means is divided and coupled to both the heat sink and the charger. Therefore, cooling of the heat sink can be achieved with simple structure and toner dirt spreading can be prevented. Also the air flow generating means is combined with the air flow absorbing means and the ozone absorbing and resolving means is combined with the air flow dirt absorbing means. Thus absorbing and resolving the ozone and the dust can be achieved efficiently and the exhausted air can be cleaned. Moreover flow capacity of the air flow absorbing means is higher than the flow capacity of the air generating means. As a result, the presence of ozone and/or toner dirt can be prevented, and therefore the reliability can be superior.

(17) The board on which the LED array is mounted, the charger and the rod lens array are held in the apparatus body by one holding case. Compared to being installed by individual holding cases, the apparatus can be a smaller size and the cost of the apparatus can be reduced. Also the charger is installed efficiently in the space between the board holding the LED array and the photoconductive element. Therefore the apparatus has smaller size.

(18) Insulation is installed between the casing of the charger and the holding case or a charger casing made of insulation is fixed to the holding case. Therefore even if high voltage is input to the charger, as the holding case is not charged, driving the LED array cannot be affected adversely by the charge of the charger.

(19) The charging and LED array unit can be drawn in and a cleaning member installed at the side of the drawing mechanism. Therefore if the grid and the charge wire of the charger and the face of the rod lens array are soiled by toner dirt and etc., they can be cleaned by the cleaning member when being drawn in. Thus the performance of the initial condition can be maintained.

(20) The cleaning member is installed so as to move from the cleaning position to the retiring position. When the photoconductive element is drawn out of the apparatus, the cleaning member is moved to the retiring position. Therefore the photoconductive element can be drawn without touching the cleaning member, and the operation can be improved.

(21) A first cleaning member for the charger is installed in the side board and a second cleaning member for the LED array is installed on the arm which extends from the charger. Therefore when the charger is drawn in, the charger can be cleaned by the first cleaning member and the face of the LED array can also be cleaned by the second cleaning member. Also as the charger and the LED array are installed close to each other the toner dirt is the same between them. As a result, as the maintenance time between them is almost same, and the maintenance time can be reduced.

Various modifications will become possible for those skilled in the art after receiving the teachings of the present disclosure without departing from the scope thereof.

What is claimed as new and desired to be secured by Letters Patent of the United States is:

1. An image forming apparatus comprising:
   a rotatable photoconductive element;
   a charging device facing the periphery of said photoconductive element;
   a line exposing device facing the periphery of said photoconductive element, and having a heat sink installed thereon;
   air flow generating means for generating air flow which flows to both the heat sink and the charging means;
   developing means for developing an electrostatic latent image formed on the periphery of said photoconductive element by said line exposing device;
   drawing means for drawing in air flow between the developing means and the line exposing device; and
   absorbing and resolving means installed close to said air flow drawing means for absorbing dirt and resolving ozone included in the air flow.

2. An image forming apparatus comprising:
   a rotatable photoconductive element;
   a charging device facing the periphery of said photoconductive element;
   a line exposing device facing the periphery of said photoconductive element, and having a heat sink installed thereon;
   air flow generating means for generating air flow which flows to both the heat sink and the charging means; and
   developing means for developing an electrostatic latent image formed on the periphery of said photoconductive element by said line exposing device;
   wherein the air drawing capacity of the air flow drawing means is higher than the air flow generating capacity of the air flow generating means.

3. An image forming apparatus comprising:
   a rotatable photoconductive element;
   a charging device facing the periphery of said photoconductive element;
   a line exposing device facing the periphery of said photoconductive element, comprising a LED array as a light source, driver ICs for driving the LED array, a rod lens array for converging the light from the LED array to the photoconductive element, and a board on which the LED array and the driver ICs are installed, and which is combined and held with the charging device into one body by a holding case;

said charging device installed in a space between the photoconductive element and the board of the line exposing device; and developing means for developing an electrostatic latent image formed on the periphery of said photoconductive element by said line exposing device.

4. An apparatus as claimed in claim 3, wherein the holding casing comprises:

electrical insulation installed between the charging device and the line type exposing device.

5. An apparatus as claimed in claim 3, comprising:

a holding member made of an insulating material for holding said casing of the charging device, said holding member combined with the holding case in one body.

6. An image forming apparatus comprising:

a rotatable photoconductive element;

a charging device facing the periphery of said photoconductive element;

a line exposing device facing the periphery of said photoconductive element, comprising a LED array as a light source, driver ICs for driving the LED array, a rod lens array for converging the light from the LED array to the photoconductive element, and a board on which the LED array and the driver ICs are installed, and which is combined and held with the charging device into one body by a holding case;

wherein the line exposing device combined with the charger is held in the holding case so as to be movable in an axial direction of the photoconductive element; and a cleaning member located adjacent a line of movement of the line exposing means and combined with the charging device, said cleaning member touching and cleaning a charge wire and a grid of the charging device and a face of a rod lens array facing the photoconductive element at the same time.

7. An apparatus as claimed in claim 6, wherein the cleaning member is installed so as to move from a cleaning position to a retiring position which prevents the photoconductive element from being moved in said axial direction.

* * * * *

UNITED STATES PATENT AND TRADEMARK OFFICE
CERTIFICATE OF CORRECTION

PATENT NO. : 5,376,994
DATED : December 27, 1994
INVENTOR(S) : Takashi MAMA, et al.

It is certified that error appears in the above-indentified patent and that said Letters Patent is hereby corrected as shown below:

On the title page, Item [30], three foreign applications were omitted from the priority data.  Please add:

```
--Oct. 31, 1991   [JP]    Japan ........... 3-286052
   Feb. 14, 1992  [JP]    Japan ........... 4-028290
   May  27, 1992  [JP]    Japan ........... 4-158882--
```

Signed and Sealed this

Fifteenth Day of August, 1995

*Attest:*

BRUCE LEHMAN

*Attesting Officer*  Commissioner of Patents and Trademarks